US012568439B2

(12) United States Patent
Shrestha et al.

(10) Patent No.: US 12,568,439 B2
(45) Date of Patent: Mar. 3, 2026

(54) SLEEP WAKEUP METHODS FOR DISCONTINUOUS COVERAGE IN NON-TERRESTRIAL NETWORK

(71) Applicant: QUALCOMM Incorporated, San Diego, CA (US)

(72) Inventors: Bharat Shrestha, San Diego, CA (US); Mungal Singh Dhanda, Slough (GB); Umesh Phuyal, San Diego, CA (US); Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 963 days.

(21) Appl. No.: 17/393,485

(22) Filed: Aug. 4, 2021

(65) Prior Publication Data

US 2023/0043459 A1 Feb. 9, 2023

(51) Int. Cl.
*H04W 52/02* (2009.01)
*H04W 4/70* (2018.01)
(Continued)

(52) U.S. Cl.
CPC ....... *H04W 52/0241* (2013.01); *H04W 24/08* (2013.01); *H04W 60/04* (2013.01); *H04W 68/005* (2013.01); *H04W 76/19* (2018.02); *H04W 76/30* (2018.02); *H04W 74/0833* (2013.01); *H04W 74/0838* (2024.01); *H04W 84/06* (2013.01)

(58) Field of Classification Search
CPC . H04W 52/0241; H04W 76/19; H04W 76/30; H04W 24/08; H04W 68/005; H04W 74/0833
See application file for complete search history.

(56) References Cited

U.S. PATENT DOCUMENTS

| | | | |
|---|---|---|---|
| 10,271,282 B2 * | 4/2019 | Wilhelmsson | ...... H04W 40/005 |
| 2006/0111098 A1 * | 5/2006 | Abdel-Kader | .......... H04L 65/80 455/421 |

(Continued)

OTHER PUBLICATIONS

Gatehouse., et al., "Mobile-Termination with Non-Continuous Coverage in NTN", 3GPP TSG RAN WG2 meeting #114, R2-2106420, 3rd Generation Partnership Project (3GPP), Mobile Competence Centre, 650, Route Des Lucioles, F-06921 Sophia-Antipolis Cedex, France, vol. RAN WG2, No. Electronic Meeting, May 19, 2021-May 27, 2021, May 11, 2021, XP052007766, 3 Pages, paragraph [0002]-paragraph [0004], Sections 1-4, figures 1-3.

(Continued)

*Primary Examiner* — Jenee Holland
(74) *Attorney, Agent, or Firm* — Dinsmore & Shohl LLP

(57) ABSTRACT

Certain aspects of the present disclosure provide techniques for resuming communications with a non-terrestrial network in discontinuous coverage. A method that may be performed by a user equipment (UE) includes determining that the UE is or will be in an out-of-coverage state with a non-terrestrial network (NTN) for a first duration; entering a power saving state in response to the determination; exiting the power saving state when the UE expects to be in an in-coverage state with the NTN; and taking one or more actions to resume communications with the NTN.

30 Claims, 13 Drawing Sheets

(51) Int. Cl.

| | |
|---|---|
| *H04W 24/08* | (2009.01) |
| *H04W 60/04* | (2009.01) |
| *H04W 68/00* | (2009.01) |
| *H04W 74/0833* | (2024.01) |
| *H04W 76/19* | (2018.01) |
| *H04W 76/30* | (2018.01) |
| *H04W 84/06* | (2009.01) |
| *H04W 74/0838* | (2024.01) |

(56) References Cited

U.S. PATENT DOCUMENTS

| | | | | |
|---|---|---|---|---|
| 2007/0247359 A1* | 10/2007 | Ghazarian | ............... | G01S 19/34 |
| | | | | 455/343.2 |
| 2008/0246656 A1* | 10/2008 | Ghazarian | .......... | G08B 13/1427 |
| | | | | 455/343.2 |
| 2009/0040041 A1* | 2/2009 | Janetis | ............... | G08B 21/0277 |
| | | | | 340/539.13 |
| 2012/0235860 A1* | 9/2012 | Ghazarian | .......... | G08B 21/0202 |
| | | | | 342/357.54 |
| 2013/0051338 A1* | 2/2013 | Ryu | ........................ | H04W 4/70 |
| | | | | 370/329 |
| 2013/0303152 A1* | 11/2013 | Kim | .................... | H04W 72/541 |
| | | | | 455/422.1 |
| 2014/0141795 A1* | 5/2014 | Abraham | .................. | G06F 1/00 |
| | | | | 455/456.1 |
| 2014/0274225 A1* | 9/2014 | Lacatus | ............. | H04W 52/0241 |
| | | | | 455/574 |
| 2016/0205630 A1* | 7/2016 | Chen | .................... | H04W 48/02 |
| | | | | 455/574 |
| 2016/0302249 A1* | 10/2016 | Sheng | .................... | H04W 4/70 |
| 2018/0146507 A1* | 5/2018 | Tsuda | .................... | H04W 88/04 |
| 2018/0310249 A1* | 10/2018 | Wilhelmsson | .... | H04W 52/0241 |
| 2019/0037629 A1* | 1/2019 | Ryu | .................... | H04W 88/16 |
| 2019/0289571 A1* | 9/2019 | Park | .................... | H04W 60/00 |
| 2020/0077253 A1* | 3/2020 | Kim | .................... | H04W 76/30 |
| 2020/0322850 A1* | 10/2020 | Zhu | .................... | H04W 76/25 |
| 2020/0351953 A1* | 11/2020 | Pradas | ............. | H04W 74/0833 |
| 2021/0029618 A1* | 1/2021 | Jain | .................... | H04W 48/02 |
| 2021/0092781 A1* | 3/2021 | Lauridsen | ............. | H04W 24/02 |
| 2021/0120495 A1* | 4/2021 | Ma | .................... | H04W 68/005 |

| | | | | |
|---|---|---|---|---|
| 2021/0385675 A1* | 12/2021 | Määttänen | .......... | H04B 7/1851 |
| 2022/0039082 A1* | 2/2022 | Belleschi | .............. | H04W 72/51 |
| 2022/0085874 A1* | 3/2022 | Shrestha | .............. | H04W 48/20 |
| 2022/0110029 A1* | 4/2022 | Shrestha | ........... | H04B 7/18513 |
| 2022/0217575 A1* | 7/2022 | Wang | ................ | H04W 28/0268 |
| 2022/0232503 A1* | 7/2022 | Cheng | ................ | H04W 56/009 |
| 2022/0295444 A1* | 9/2022 | Wu | ........................ | H04W 68/02 |
| 2022/0338159 A1* | 10/2022 | Phuyal | .................. | H04W 24/10 |
| 2023/0043459 A1* | 2/2023 | Shrestha | .............. | H04W 60/04 |
| 2023/0171835 A1* | 6/2023 | Fang | .................... | H04W 76/27 |
| | | | | 370/329 |
| 2023/0209464 A1* | 6/2023 | Tsai | .................. | H04W 52/0216 |
| | | | | 370/311 |
| 2023/0328690 A1* | 10/2023 | Xu | ...................... | H04W 72/232 |
| | | | | 370/329 |
| 2023/0336241 A1* | 10/2023 | Kim | ...................... | H04W 68/02 |
| 2024/0014891 A1* | 1/2024 | Chen | ................. | H04B 7/18513 |
| 2024/0032139 A1* | 1/2024 | Nuggehalli | ....... | H04W 52/0274 |
| 2024/0049171 A1* | 2/2024 | Khirallah | ........... | H04B 7/18513 |
| 2024/0073862 A1* | 2/2024 | Kaikkonen | .......... | H04W 68/02 |
| 2024/0098815 A1* | 3/2024 | Freda | .................... | H04W 76/14 |
| 2024/0129024 A1* | 4/2024 | Fine | ................... | H04B 7/18513 |
| 2024/0188042 A1* | 6/2024 | Mohammad Soleymani | ............. | |
| | | | | H04W 76/28 |
| 2024/0196371 A1* | 6/2024 | Lauridsen | ............. | H04W 68/02 |

OTHER PUBLICATIONS

Huawei., et al., "Discussion on Mobility Enhancement for IoT NTN", 3GPP TSG RAN WG2 #114-e, R2-2105663, 3rd Generation Partnership Project (3GPP), Mobile Competence Centre, 650, Route Des Lucioles, F-06921 Sophia-Antipolis Cedex, France, vol. RAN WG2, No. Electronic Meeting, May 19, 2021-May 27, 2021, May 10, 2021, 6 Pages, XP052003892, Sections 1, 2, figures 1,2.

International Search Report and Written Opinion—PCT/US2022/074262—ISA/EPO—Nov. 8, 2022.

Kodheli O., et al., "NB-IoT via LEO Satellites: An Efficient Resource Allocation Strategy for Uplink Data Transmission", IEEE Internet of Things Journal, vol. 9, No. 7, Jul. 2, 2021, 14 Pages, XP055974205, DOI: 10.1109/JIOT.2021.3109456, Sections I-VII, figures 1-7,10.

* cited by examiner

600

800

900

1000

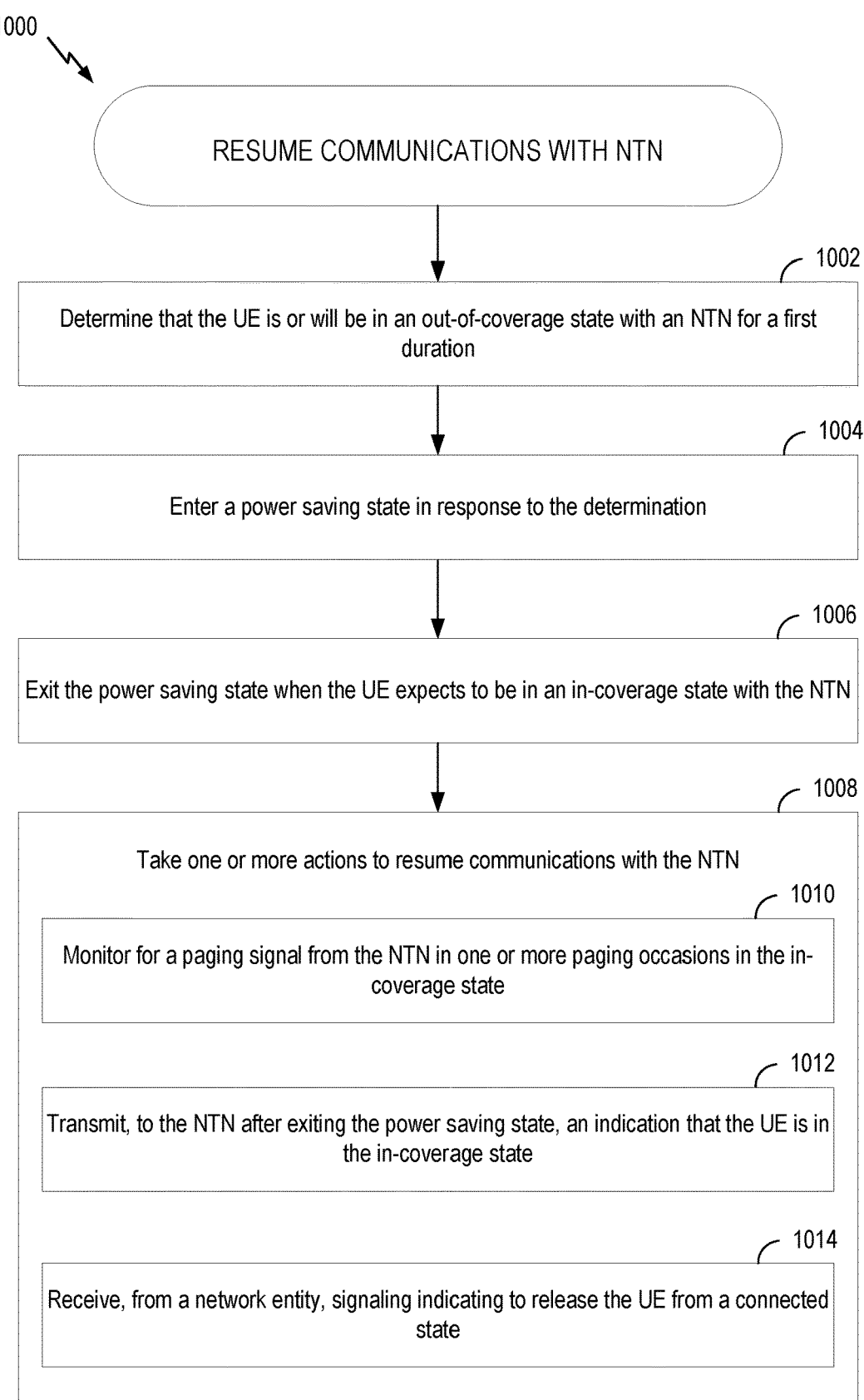

RESUME COMMUNICATIONS WITH NTN

1002

Determine that the UE is or will be in an out-of-coverage state with an NTN for a first duration

1004

Enter a power saving state in response to the determination

1006

Exit the power saving state when the UE expects to be in an in-coverage state with the NTN

1008

Take one or more actions to resume communications with the NTN

1010

Monitor for a paging signal from the NTN in one or more paging occasions in the in-coverage state

1012

Transmit, to the NTN after exiting the power saving state, an indication that the UE is in the in-coverage state

1014

Receive, from a network entity, signaling indicating to release the UE from a connected state

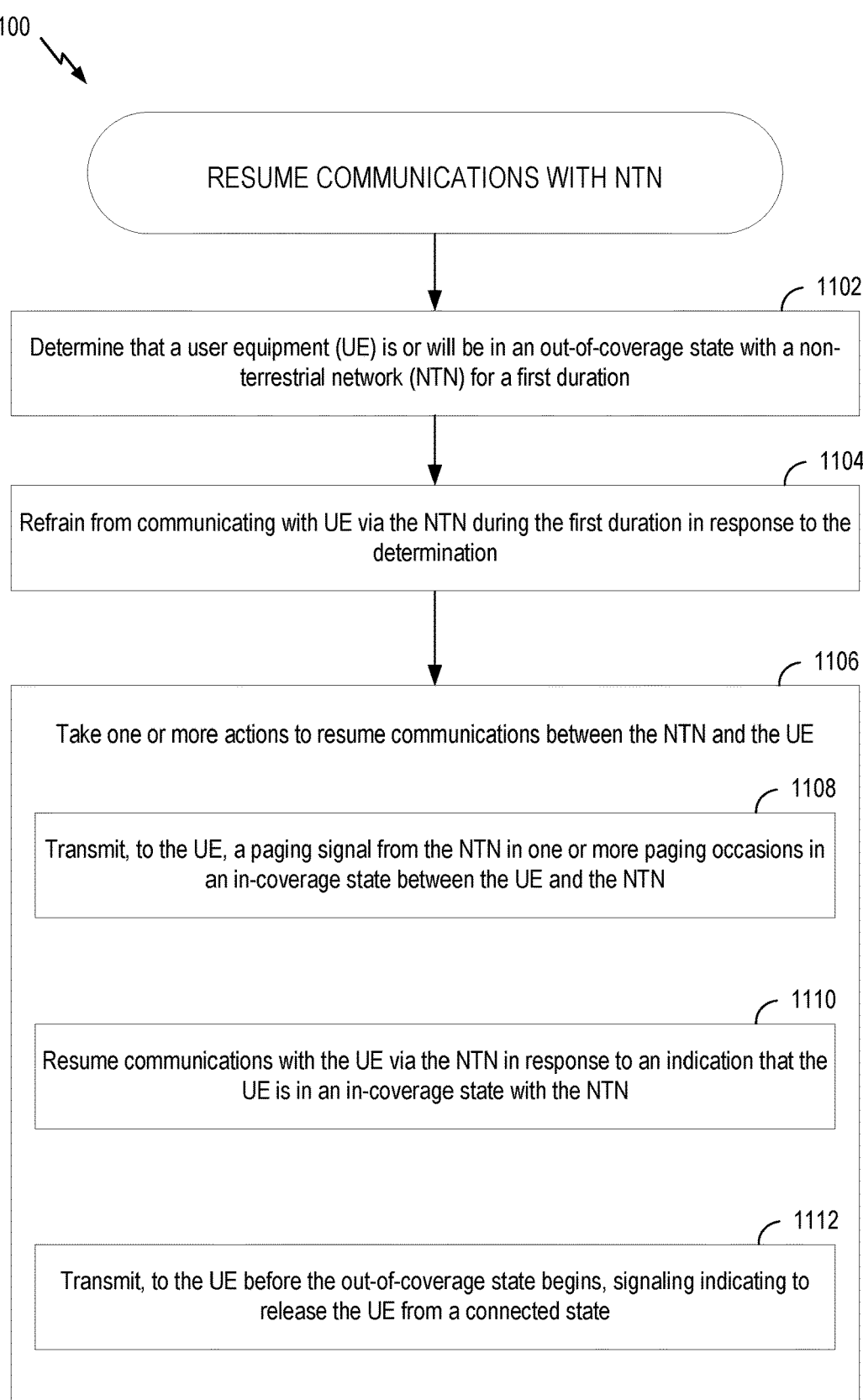

RESUME COMMUNICATIONS WITH NTN

1102

Determine that a user equipment (UE) is or will be in an out-of-coverage state with a non-terrestrial network (NTN) for a first duration

1104

Refrain from communicating with UE via the NTN during the first duration in response to the determination

1106

Take one or more actions to resume communications between the NTN and the UE

1108

Transmit, to the UE, a paging signal from the NTN in one or more paging occasions in an in-coverage state between the UE and the NTN

1110

Resume communications with the UE via the NTN in response to an indication that the UE is in an in-coverage state with the NTN

1112

Transmit, to the UE before the out-of-coverage state begins, signaling indicating to release the UE from a connected state

FIG. 11

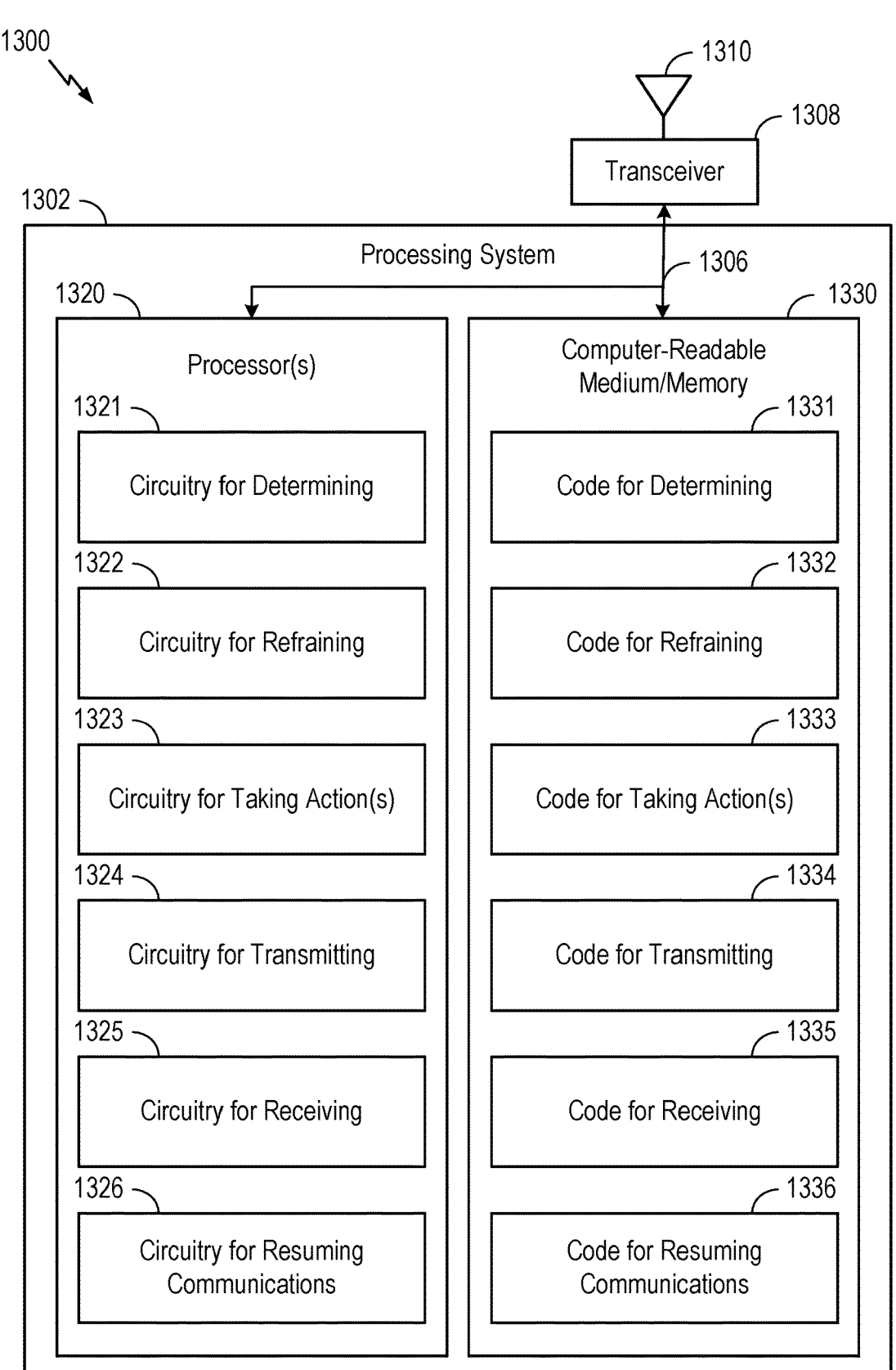

1300

1310

1308

Transceiver

1302

Processing System

1306

1320

Processor(s)

1330

Computer-Readable
Medium/Memory

1321

Circuitry for Determining

1331

Code for Determining

1322

Circuitry for Refraining

1332

Code for Refraining

1323

Circuitry for Taking Action(s)

1333

Code for Taking Action(s)

1324

Circuitry for Transmitting

1334

Code for Transmitting

1325

Circuitry for Receiving

1335

Code for Receiving

1326

Circuitry for Resuming
Communications

1336

Code for Resuming
Communications

FIG. 13

SLEEP WAKEUP METHODS FOR DISCONTINUOUS COVERAGE IN NON-TERRESTRIAL NETWORK

INTRODUCTION

Aspects of the present disclosure relate to wireless communications, and more particularly, to techniques for communicating in discontinuous coverage of a non-terrestrial network.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE). The method generally includes determining that the UE is or will be in an out-of-coverage state with a non-terrestrial network (NTN) for a first duration and entering a power saving state in response to the determination. The method also includes exiting the power saving state when the UE expects to be in an in-coverage state with the NTN and taking one or more actions to resume communications with the NTN.

One aspect provides a method of wireless communication by a network entity. The method generally includes determining that a UE is or will be in an out-of-coverage state with a NTN for a first duration and refraining from communicating with the UE during the first duration in response to the determination. The method also includes taking one or more actions to resume communications between the NTN and the UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 10 is a flow diagram illustrating an example method for wireless communications by a user equipment to resume communications with a non-terrestrial network.

FIG. 11 is a flow diagram illustrating an example method for wireless communications by a network entity.

FIG. 13 depicts aspects of an example communications device.

DETAILED DESCRIPTION

Figure 1:
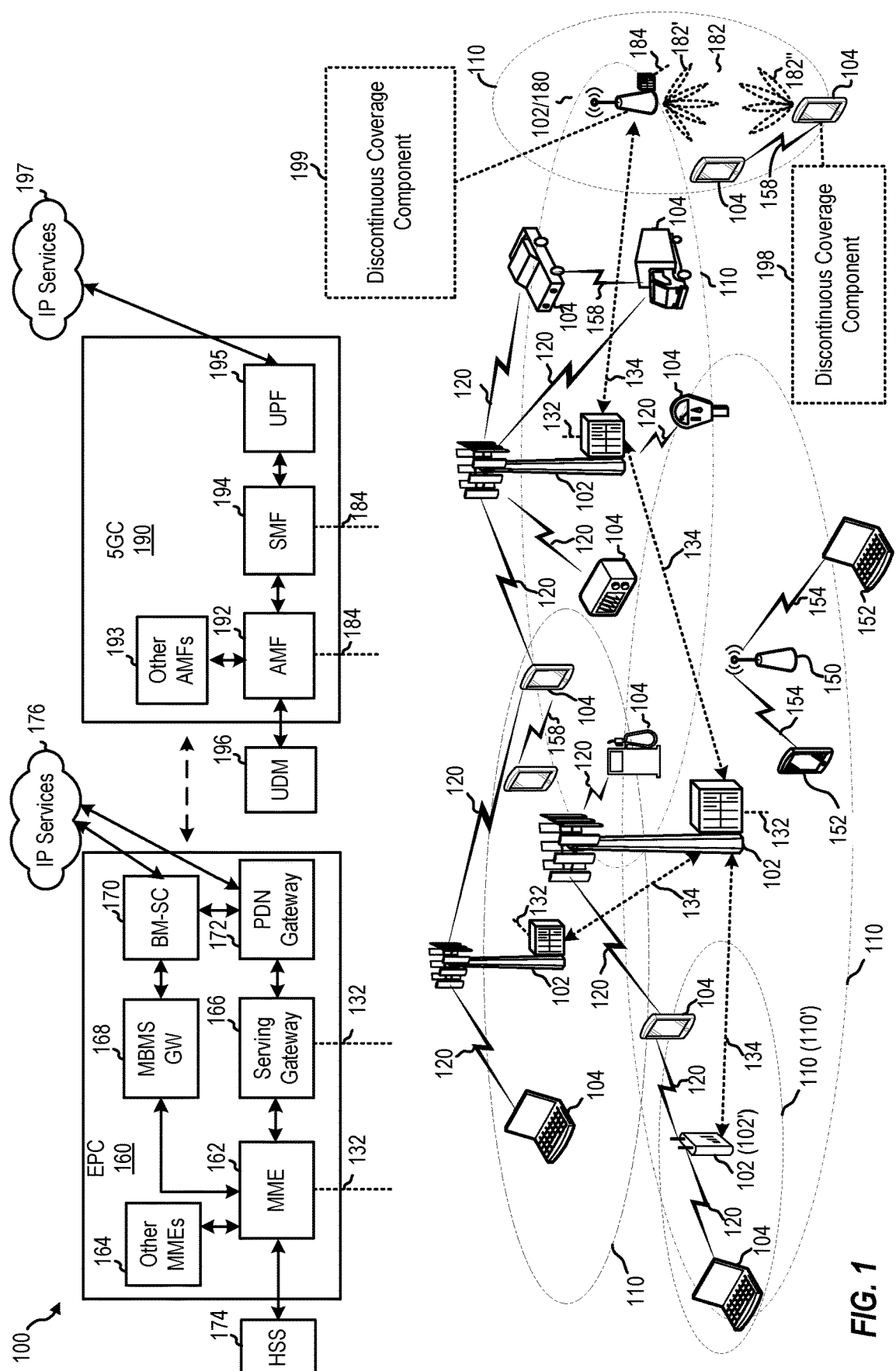
FIG. 1 is a block diagram conceptually illustrating an example wireless communication network.

Aspects of the present disclosure provide apparatuses, methods, processing systems, and computer-readable mediums for resuming communications with a non-terrestrial network in discontinuous coverage.

In certain cases, a non-terrestrial network (NTN) may provide discontinuous radio coverage to a user equipment (UE), for example, due to the orbit of NTN satellites. For example, some NTNs (such as a low Earth orbit (LEO) systems) may have one or more revisit times (which may also be known as the response time or coverage gap) in certain geographical areas. The revisit time may be the duration between consecutive viewings (or coverage areas) of a given location for an NTN. As an example, the satellite revisit time (or coverage gap) could be 10 to 40 minutes depending on the number of satellites deployed. The UE may be unreachable by the wireless network (such as the core network) during revisit time. During the coverage gap, the UE and/or network may attempt to reconnect or communicate with each other. Such operations during the coverage gap may be inefficient for power consumption, especially at the UE, and/or for signaling overhead (e.g., affecting spectral efficiency) at the radio access network.

In certain aspects, when a UE is in a power saving state (e.g., discontinuous reception (DRX) cycle, power saving mode (PSM), or mobile initiated connection only (MICO) mode), the UE may wake up to monitor a certain number of paging occasions (or establish a connection) during an in-coverage state (e.g., at the start of an in-coverage period). As used herein, a power saving state of the UE may refer to a mode in which the UE is using a reduced amount of power such as a DRX cycle (e.g., extended DRX cycle), PSM, or MICO mode. In certain aspects, if a UE detects that the UE is in an out-of-coverage state (e.g., if the UE fails to detect a paging signal during at least a certain number of paging occasions), the UE may send to the network an indication of when the UE returns to an in-coverage state, for example, to receive any missed paging during the out-of-coverage period with the NTN. In certain aspects, if the UE is exiting the power saving state from a PSM, the in-coverage indication may include a tracking area update request, which may be handled by an access stratum (AS) layer and/or a non-access stratum (NAS) layer. For certain aspects, the network may release the UE from a connected state before the coverage gap to trigger the UE into a power saving state during the coverage gap.

The techniques for resuming communications with the NTN described herein may facilitate desirable power savings at the UE (for example, due to the various triggers that initiate the power saving state at the UE during the coverage gap), desirable performance (e.g., latency and/or data rate) for discontinuous coverage (for example, due to the various techniques for resuming the connection after the coverage gap), and/or spectral efficiencies (for example, due to the network and/or UE refraining from communicating during the coverage gap).

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182''. UE 104 may also transmit a beamformed signal to the base station 180 in one or more transmit directions 182''. Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes discontinuous coverage component 199, which may be configured to resume communications between a user equipment and a non-terrestrial network, as further described herein. Wireless network 100 further includes discontinuous coverage component 198, which may be used configured to resume communications with a non-terrestrial network, as further described herein.

Figure 2:
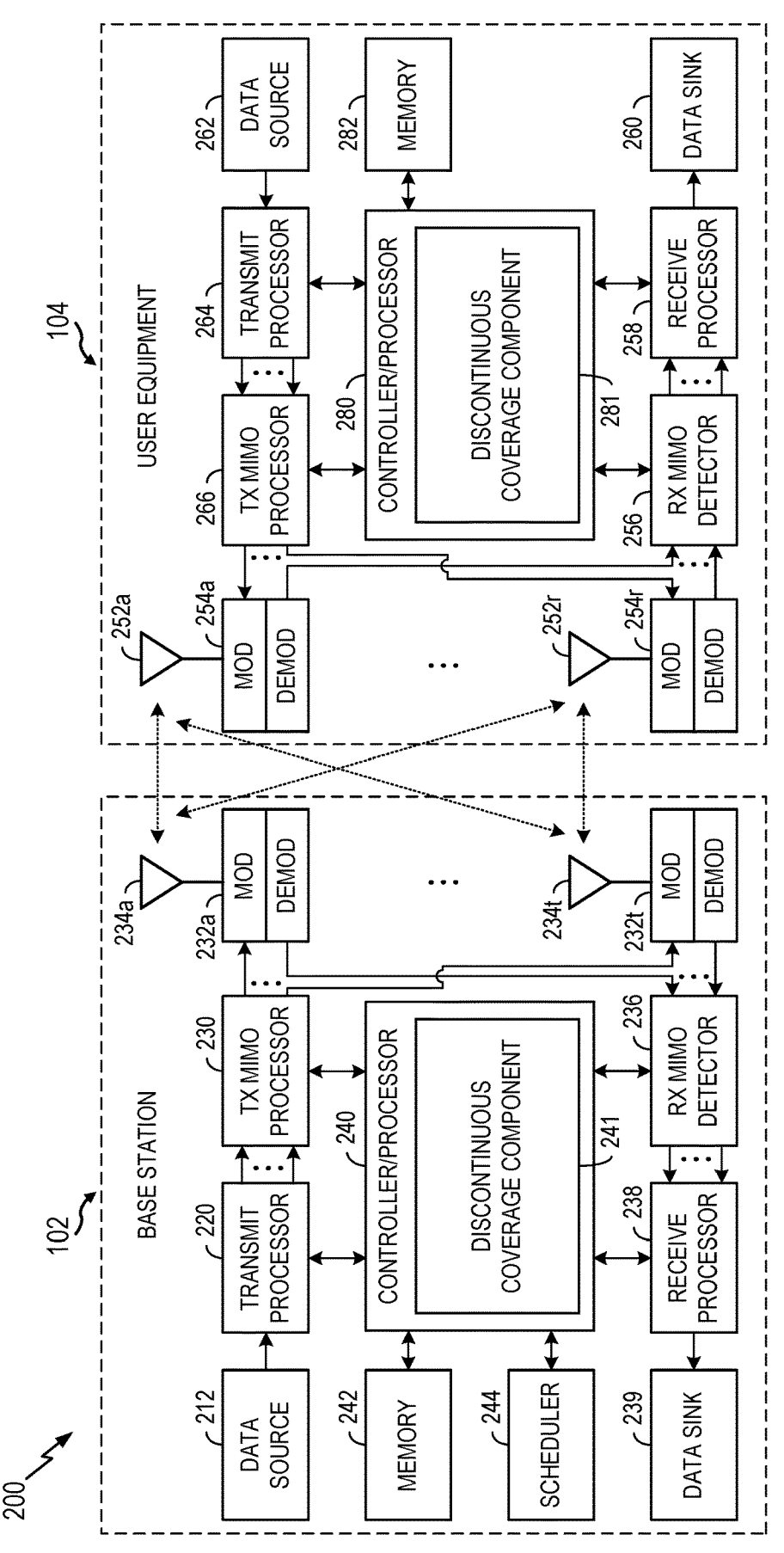
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a discontinuous coverage component 241, which may be representative of the discontinuous coverage component 199 of FIG. 1. Notably, while depicted as an aspect of controller/processor 240, discontinuous coverage component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes a discontinuous coverage component 281, which may be representative of the discontinuous coverage component 198 of FIG. 1. Notably, while depicted as an aspect of controller/processor 280, the discontinuous coverage component 281 may be implemented additionally or alternatively in various other aspects of user equipment 104 in other implementations.

Figure 3:
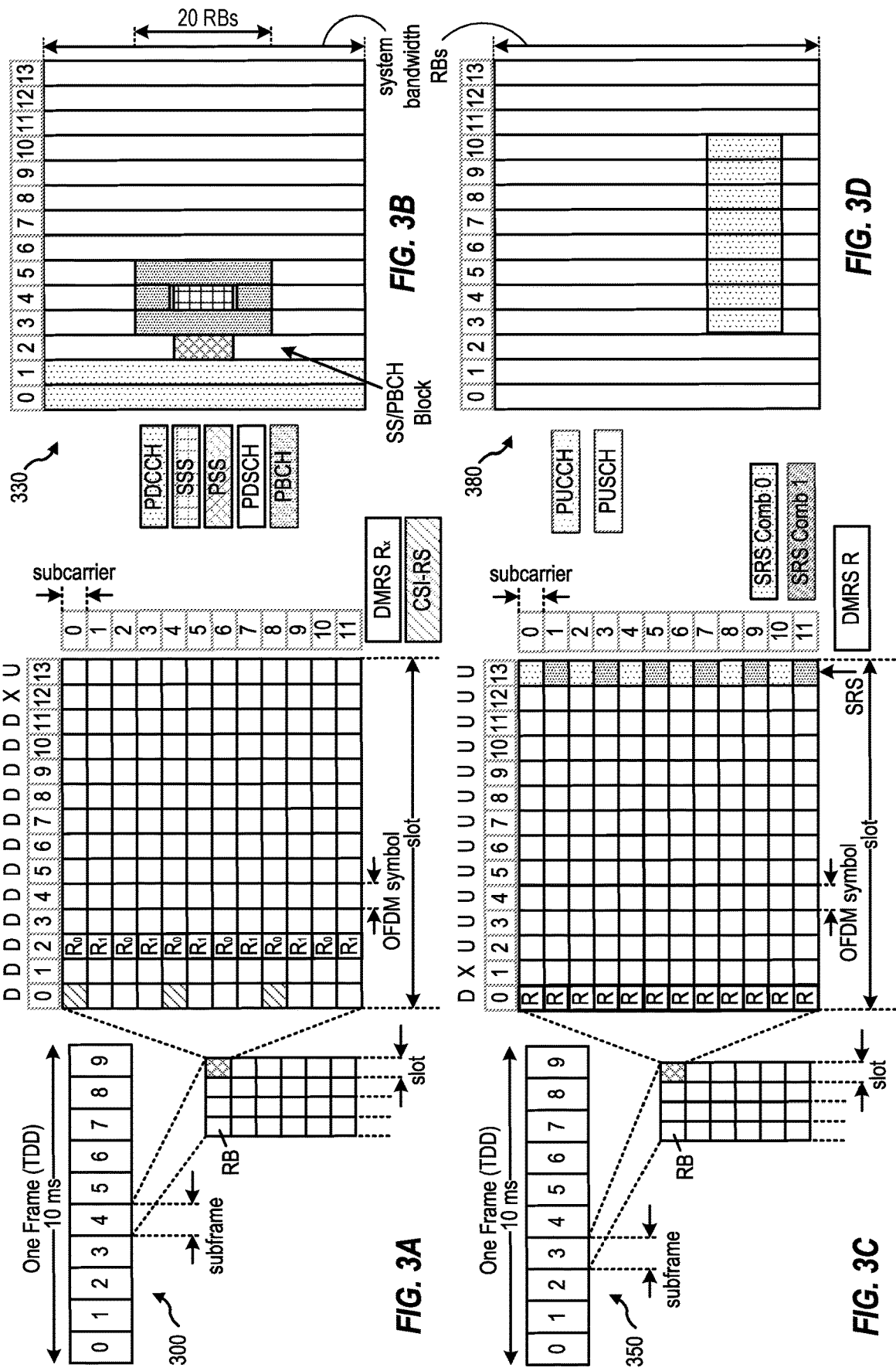
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Non-Terrestrial Network

Figure 4:
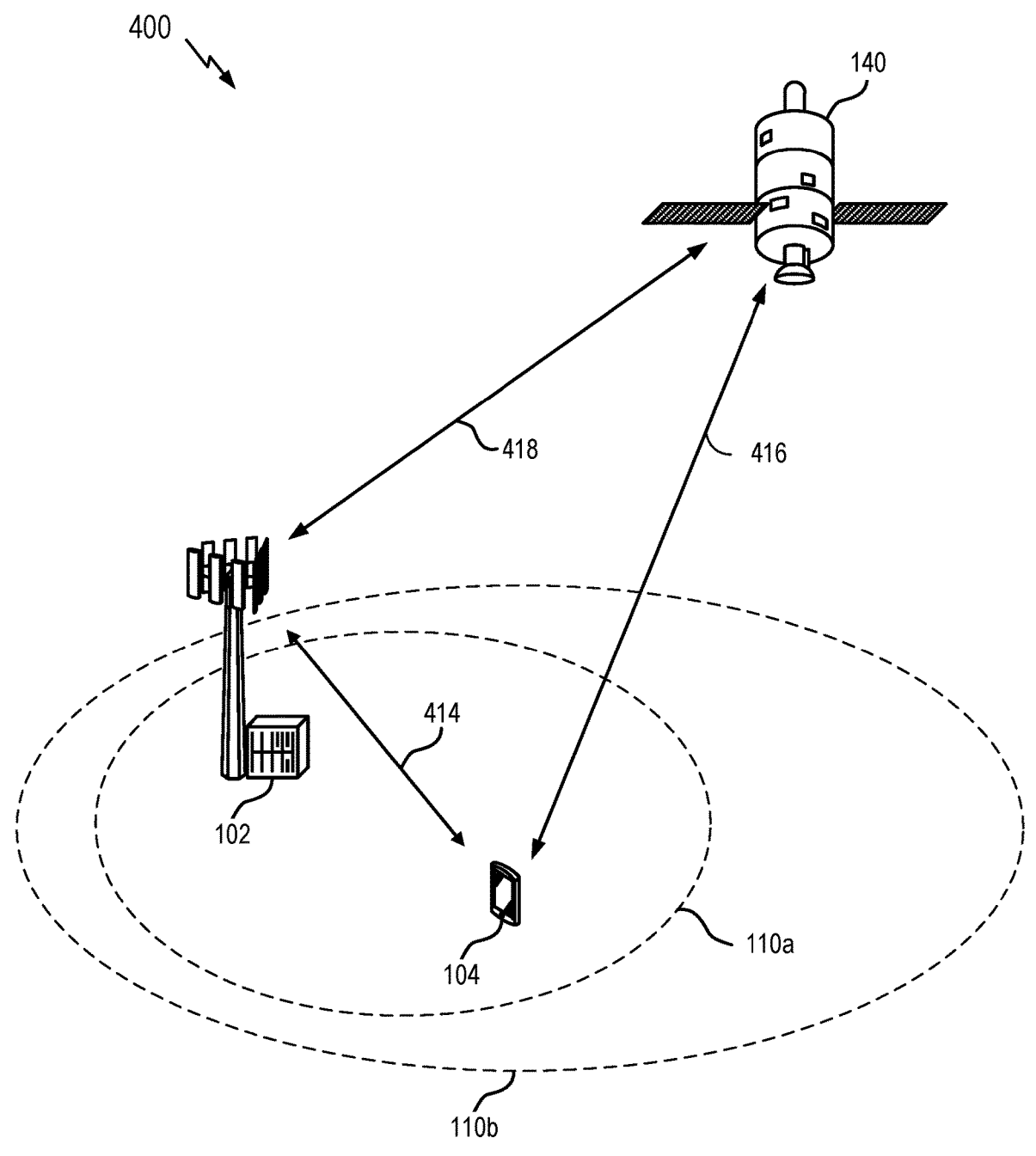
FIG. 4 is a diagram illustrating an example wireless communication network having a non-terrestrial network entity.

FIG. 4 illustrates an example of a wireless communications network 400 including a non-terrestrial network (NTN) entity 140 (which may be generally referred to as NTN 140), in which aspects of the present disclosure may be practiced. In some examples, the wireless communications network 400 may implement aspects of the wireless communication network 100. For example, the wireless communications network 400 may include BS 102, UE 104, and the non-terrestrial network entity 140, such as a satellite. BS 102 may serve a coverage area or cell 110*a* in cases of a terrestrial network, and non-terrestrial network entity 140 may serve the coverage area 110*b* in cases of a non-terrestrial network (NTN). Some NTNs may employ airborne platforms (e.g., a drone or balloon) and/or spaceborne platforms (e.g., a satellite).

The non-terrestrial network entity 140 may communicate with the BS 102 and UE 104 as part of wireless communications in an NTN. In cases of a terrestrial network, the UE 104 may communicate with the BS 102 over a communication link 414. In the case of NTN wireless communications, the non-terrestrial network entity 140 may be a serving cell for the UE 104 via a communication link 416. In certain aspects, the non-terrestrial network entity 140 may act as a relay (or a remote radio head) for the BS 102 and the UE 104. For example, the BS 102 may communicate with the non-terrestrial network entity 140 via a communication link 418, and the non-terrestrial network entity may relay signaling between the BS 102 and UE 104 via the communication links 416, 418.

In certain cases, an NTN may provide discontinuous radio coverage to a UE, for example, due to the orbit of NTN satellites. For example, some NTNs (such as a low Earth orbit (LEO) systems) may have one or more revisit times (which may also be known as the response time or coverage gap) in certain geographical areas. The revisit time may be the duration between consecutive viewings (or coverage areas) of a given location for an NTN. As an example, the satellite revisit time (or coverage gap) could be 10 to 40 minutes depending on the number of satellites deployed. The UE may be unreachable by the wireless network (such as the core network) during revisit time.

Figure 5:
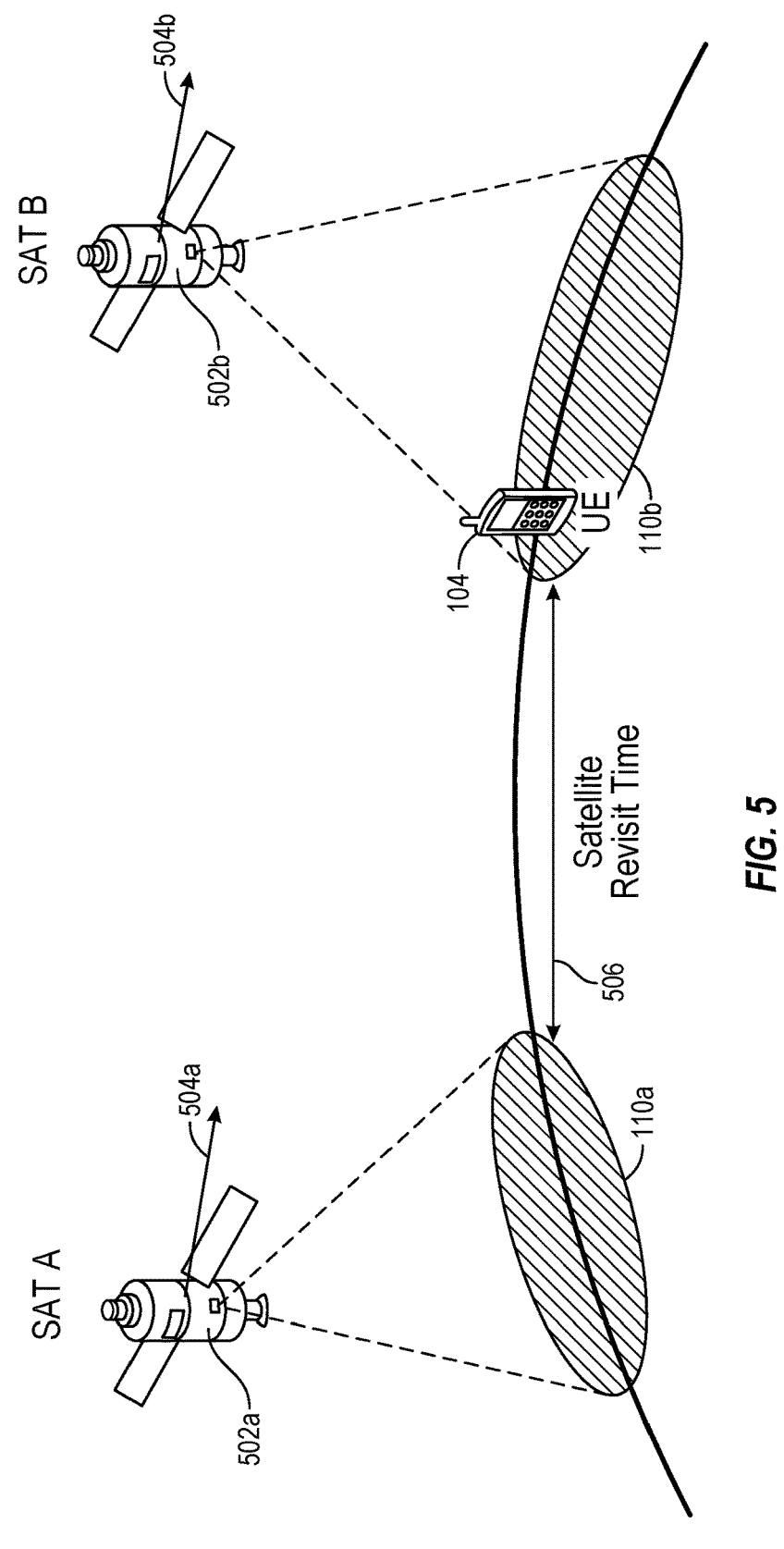
FIG. 5 is a diagram illustrating an example of discontinuous coverage of a non-terrestrial network.

FIG. 5 is a diagram illustrating an example NTN 500 having a revisit time 506 between two satellites 502*a* and 502*b*. As shown, the UE 104 may be on the edge of the coverage area 110*b* of the second satellite 502*b*. The revisit time 506 may provide a coverage gap between the coverage areas 110*a*, 110*b* of the satellites 502*a*, 502*b*. As the satellites 502*a*, 502*b* orbit generally in the respective directions 504*a*, 504*b*, the coverage areas 110*a*, 110*b* as well as the revisit time 506 pass over the UE 104, such that the UE 104 may experience discontinuous coverage with the NTN 500. When a UE (e.g., the UE 104) is in a coverage area (e.g., the coverage areas 110*a* or 110*b*) of an NTN, the UE may be considered to be in an in-coverage state with the NTN, and when the UE is in the coverage gap (e.g., the revisit time 506), the UE may be considered to be in an out-of-coverage state with the NTN for a certain duration (e.g., the revisit time).

The revisit time may present various issues in a wireless communication network. For example, when a UE is out-of-coverage with the NTN (e.g., when the UE is in a coverage gap), the wireless network (e.g., the core network) may not be aware of the coverage gap, and the wireless network may attempt to communicate with the UE while the UE is in the coverage gap of the NTN. For example, the core network may attempt to page the UE, and the core network may consider the non-responsiveness of the UE as paging failures. For a mobile terminated call, paging a UE may not be possible during the revisit time. The UE may also perform initial registration or protocol data unit (PDU) establishment procedure when the UE initiates a mobile originated call during the coverage gap. Another issue is that the UE may not recognize the NTN has coverage gap(s) and enter a power saving state (e.g., discontinuous reception (DRX) cycle, power saving mode (PSM), mobile initiated connection only (MICO) mode) during the in-coverage state with the NTN. The UE may also exit the power saving state and attempt to communicate with the NTN during the coverage gap. Such operations during the coverage gap may be inefficient for power consumption, especially at the UE, and/or for signaling overhead (e.g., affecting spectral efficiency) at the radio access network.

To take into account the revisit time, certain wireless networks may provide information related to the discontinuous coverage of an NTN to the UE and/or core network. Such information may enable the UE and/or core network to determine when to expect the coverage gap in the NTN. Certain wireless networks may consider the UE to be powered off or in PSM or MICO during the coverage gap.

The wireless network may configure certain power saving state cycles (e.g., DRX cycle and/or PSM cycle) during the coverage gap. The wireless network may adjust the paging window of a DRX cycle to be in the in-overage period of the NTN.

Accordingly, what is needed are techniques and apparatus for resuming communications for discontinuous coverage in an NTN.

Aspects Related to Sleep Wakeup Methods for Discontinuous Coverage in Non-Terrestrial Network Aspects of the present disclosure provide techniques and apparatus for resuming communications for discontinuous coverage in an NTN. In certain aspects, when a UE is in a power saving state (e.g., DRX cycle, PSM, or MICO mode), the UE may wake up to monitor a certain number of paging occasions (or establish a connection) during an in-coverage state (e.g., at the start of an in-coverage period). As used herein, a power saving state of the UE may refer to a mode in which the UE is using a reduced amount of power such as a DRX cycle (e.g., extended DRX cycle), PSM, or MICO mode. In certain aspects, if a UE detects that the UE is in an out-of-coverage state (e.g., if the UE fails to detect a paging signal during at least a certain number of paging occasions), the UE may send to the network an indication of when the UE returns to an in-coverage state, for example, to receive any missed paging during the out-of-coverage period. In certain aspects, if the UE is exiting the power saving state from a PSM, the in-coverage indication may include a tracking area update request, which may be handled by an access stratum (AS) layer and/or a non-access stratum (NAS) layer. For certain aspects, the network may release the UE from a connected state before the coverage gap to trigger the UE into a power saving state during the coverage gap.

The techniques for resuming communications with the NTN described herein may facilitate desirable power savings at the UE (for example, due to the various triggers that initiate the power saving state at the UE during the coverage gap), desirable performance (e.g., latency and/or data rate) for discontinuous coverage (for example, due to the various techniques for resuming the connection after the coverage gap), and/or spectral efficiencies (for example, due to the network and/or UE refraining from communicating during the coverage gap).

In certain aspects, the UE may override or extend a power saving state that coincides with the coverage gap or in-coverage period of an NTN. Such action(s) may enable the UE to avoid paging failures due to the coverage gap.

Figure 6:
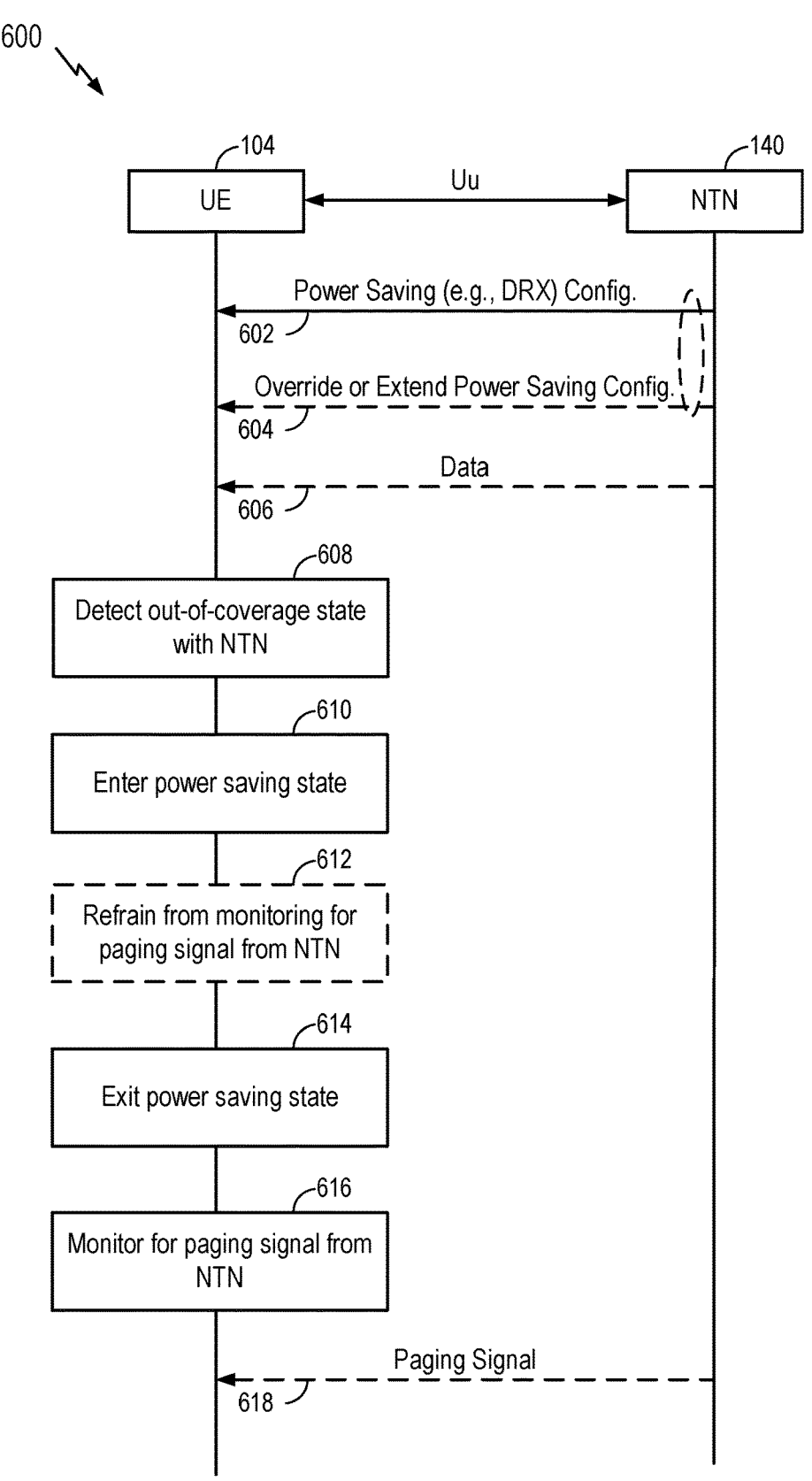
FIG. 6 is a signaling flow diagram illustrating example signaling for resuming communications with a non-terrestrial network using an extension of a power saving state.

FIG. 6 depicts an example signaling flow 600 for resuming communications for discontinuous coverage in an NTN. In this example, the NTN 140 may wirelessly communicate with the UE 104 (e.g., via a Uu interface). The flow may optionally begin at step 602, where the UE 104 may receive, from the NTN 140, a configuration for a power saving state (e.g., a DRX configuration and/or PSM configuration). As an example, the configuration may indicate the period of the DRX cycle, the duration of paging time window, and duration of the sleep mode in the DRX cycle.

At step 604, the UE may receive, from the NTN 140, an indication to override or extend the power saving configuration to take into account the coverage gap. For example, the indication may indicate to extend the DRX configuration such as adding a paging window after the coverage gap. The indication may indicate to override the DRX configuration during the coverage gap, such as refraining from monitoring for a paging signal during the coverage gap. In certain cases, the indication may be sent with the configuration (or included in the configuration) at step 602.

Optionally, at step 606, the UE 104 may communicate with the NTN 140. For example, the UE 104 may receive data from the NTN 140.

At step 608, the UE 104 may detect that the UE 104 is or will be in an out-of-coverage state with the NTN 140 for a certain duration (e.g., the revisit time). In certain cases, the UE 104 may detect the out-of-coverage state based on the lack of communications with the NTN 140, such as the absence of one or more reference signals (e.g., a synchronization signal) from the NTN 140 and/or the absence of paging from the NTN 140 during a certain number of paging occasions, for example, scheduled by the configuration at step 602.

At step 610, the UE 104 may enter a power saving state (e.g., a DRX cycle, PSM, or MICO mode), for example, in response to the detection at step 608. As an example, the UE 104 may initiate a DRX cycle in response to the detection at step 608.

Optionally, at step 612, the UE 104 may refrain from monitoring for a paging signal from NTN during the coverage gap based on the indication and/or detection at step 606. For example, the configuration may indicate to monitor for a paging signal during a monitoring window that coincides with the coverage gap. Because the UE 104 is aware that the UE 104 is in the coverage gap, the UE 104 may override the configuration and refrain from monitoring for a paging signal. Overriding the configuration for the power saving state during the coverage gap may enable to the UE to consume less power.

At step 614, the UE 104 may exit the power saving state, for example, when the UE expects to be in the in-coverage state with the NTN 140. For example, the UE 104 may end the DRX cycle initiated at step 610.

At step 616, the UE 104 may monitor for a paging signal from the NTN, for example, in response to exiting the power saving state. As an example, the configuration for the power saving state may be extended to include a paging window after the coverage gap. The UE 104 may monitor for the paging signal in an extended paging window (or extended paging occasions) that follow the coverage gap. Such an extension of the paging window may enable the UE to receive paging that was received at the NTN during the coverage gap and avoid a paging failure due to the coverage gap.

Figure 7:
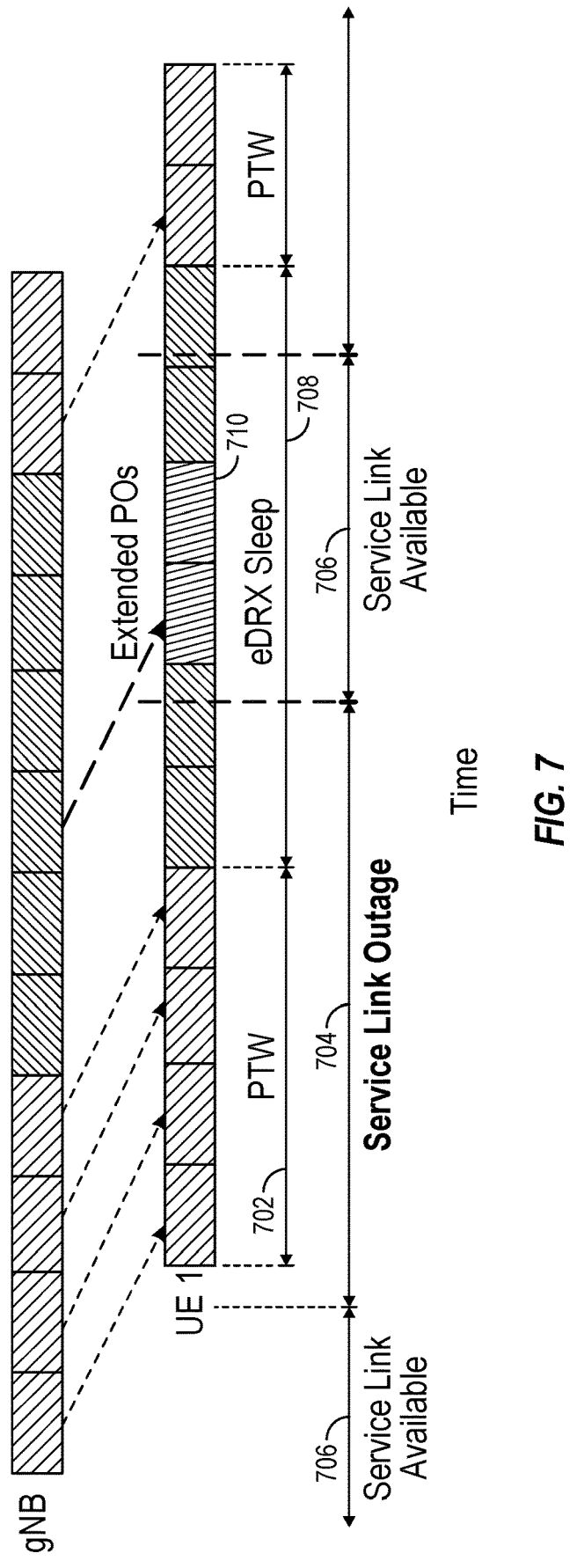
FIG. 7 is a timing diagram illustrating an example of overriding or extending a power saving state in response to a coverage gap of a non-terrestrial network.

Optionally, at step 618, the UE 104 may receive a paging signal from the NTN 140 during the extended paging window in the in-coverage state, for example, as further described herein with respect to FIG. 7.

FIG. 7 depicts an example timing diagram of extending or overriding a DRX configuration. As shown, a UE may be configured with a DRX cycle that has a paging time window 702 that overlaps with a coverage gap 704, which is arranged between in-coverage periods 706 (e.g., when the UE is in a coverage area of an NTN). The DRX cycle may also include a sleep period 708, where the UE may be in a sleep state or power saving state. The sleep period 708 may also overlap with the second in-coverage period 706. As a result of such a DRX cycle, the UE may be monitoring for a paging signal during the coverage gap 704 and in a power saving state during an in-coverage period, which may result in paging failures. As described herein with respect to the signaling flow 600, the UE may override or extend the DRX cycle, for example, in response to detecting that the UE is or will be in the coverage gap. For example, the UE may refrain from monitoring for a paging signal during a portion of the paging time window 702 that overlaps with the coverage gap 704. In certain aspects, the UE may monitor for a paging signal during an extended paging window 710 that overlaps with the second in-coverage period 706. In certain cases, the UE may monitor for a paging signal during the paging time window 702, and if the UE detects no paging signal during the paging time window 702, the UE may consider the UE to be in the coverage gap. In response to such a detection, the UE may trigger the extension of the paging time window during the second in-coverage period 706. While the example depicted in FIG. 7 is described herein with respect to a DRX configuration to facilitate understanding, aspects of the present disclosure may also be applied to other power saving states, such as overriding or extending a PSM or MICO mode.

In certain aspects, following a coverage gap, the UE may send to the radio access network an indication that the UE is in the in-coverage state with the NTN. Such an indication may enable the NTN to know when to resume communications with the UE, and the NTN may resume communications with the UE in response to the indication.

Figure 8:
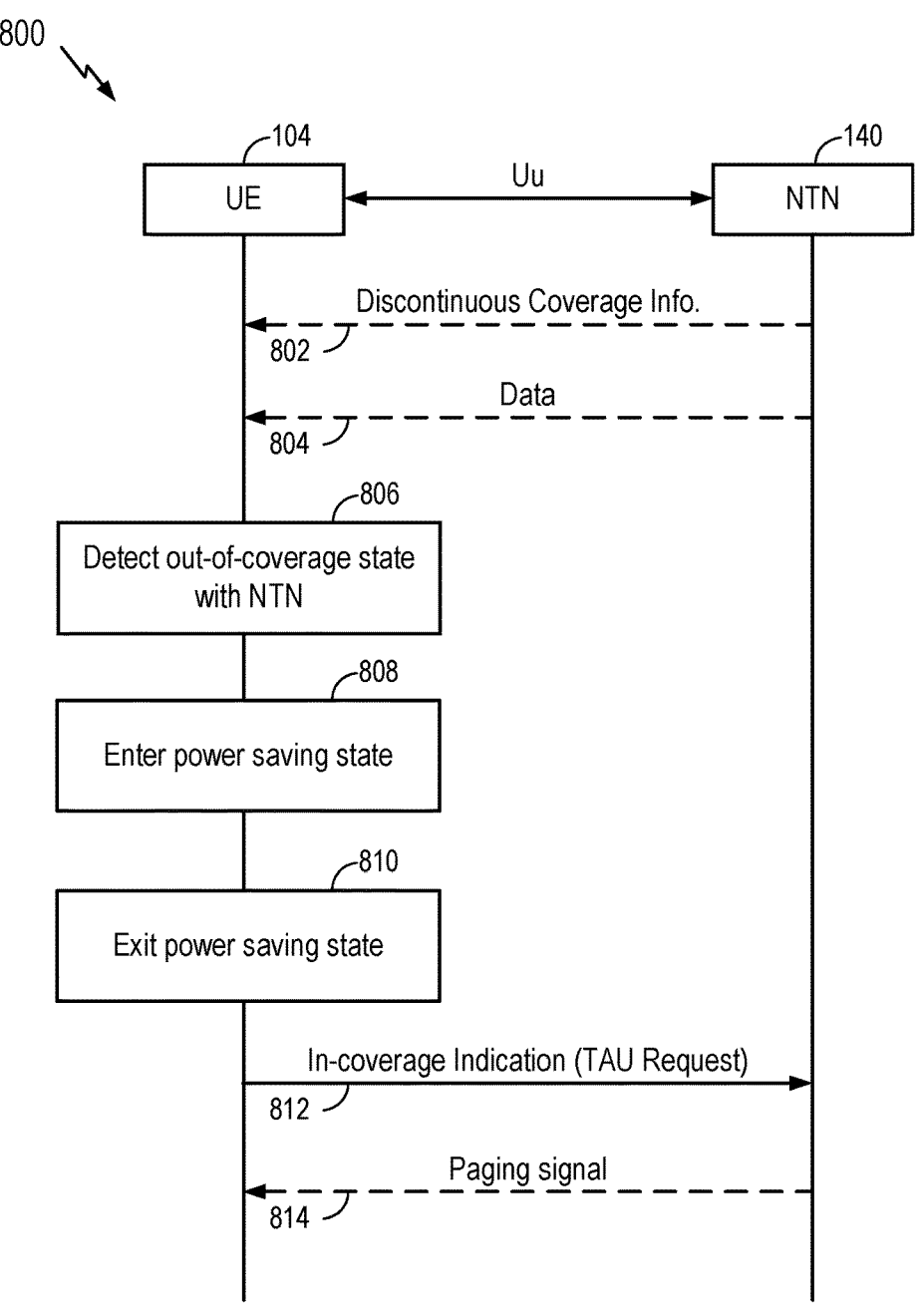
FIG. 8 is a signaling flow diagram illustrating example signaling for resuming communications with a non-terrestrial network using an in-coverage indication.

FIG. 8 depicts an example signaling flow 800 for resuming communications for discontinuous coverage in an NTN. The flow may optionally begin at step 802, where the UE 104 may receive, from the NTN 140, information related to the discontinuous coverage of an NTN. For example, the information may provide when and/or where to expect discontinuous coverage, such as the duration of a coverage gap and the location of a coverage gap.

Optionally, at step 804, the UE 104 may be in communication with the NTN 140, for example, during the in-coverage period. As an example, the UE 104 may receive data from the NTN 140.

At step 806, the UE 104 may detect that the UE 104 is or will be in an out-of-coverage state with the NTN 140 for a certain duration. For example, the UE 104 may detect the out-of-coverage state based on the discontinuous coverage information received at step 802. In certain cases, the UE 104 may detect the out-of-coverage state based on the lack of communications with the NTN 140, such as the absence of one or more reference signals (e.g., a synchronization signal) from the NTN 140 and/or the absence of paging from the NTN 140 during a certain number of paging occasions.

At step 808, the UE 104 may enter a power saving state in response to the detection at step 806. For example, the UE 104 may initiate a DRX sleep cycle, PSM, or MICO in response to the detection that the UE 104 is in the coverage gap of the NTN 140.

At step 810, the UE 104 may exit the power saving state, for example, when the UE 104 expects to be in an in-coverage state with the NTN 140. The UE 104 may determine when the coverage gap of the NTN 140 will end, for example, based on the discontinuous coverage information received at step 802 or a previous coverage gap encountered by the UE 104 for that NTN 140. The UE 104 may exit the power saving state based on the determination of when the coverage gap will end.

At step 812, the UE 104 may send, to the NTN 140, an indication that the UE 104 is in the in-coverage state with the NTN 140. In aspects, the indication may include a radio resource control (RRC) connection request, a medium access control (MAC)-control element (MAC-CE), a tracking area update (TAU) request, and/or a random access channel (RACH) preamble or resource, as further described herein. The indication may inform the NTN 140 of when the communications with the UE 104 can resume.

Optionally, at step 814, the NTN 140 may resume communications with the UE 104 in response to the indication at step 812. For example, the NTN 140 may send a paging signal to the UE 104. In certain cases, the NTN 140 may have received a paging message for the UE 104 during the coverage gap and stored the paging message for when the UE 104 returns to the in-coverage state.

In certain aspects, the network may release the UE from a connected state (e.g., RRC connected mode) before the UE enters the coverage gap with the NTN. Such a release may indicate to the UE that the coverage gap will begin and trigger the UE to enter a power saving state during the duration of the coverage gap. In certain cases, the UE may request to be released from the connected state if the UE detects that the UE cannot complete an uplink transmission before the coverage gap will begin.

Figure 9:
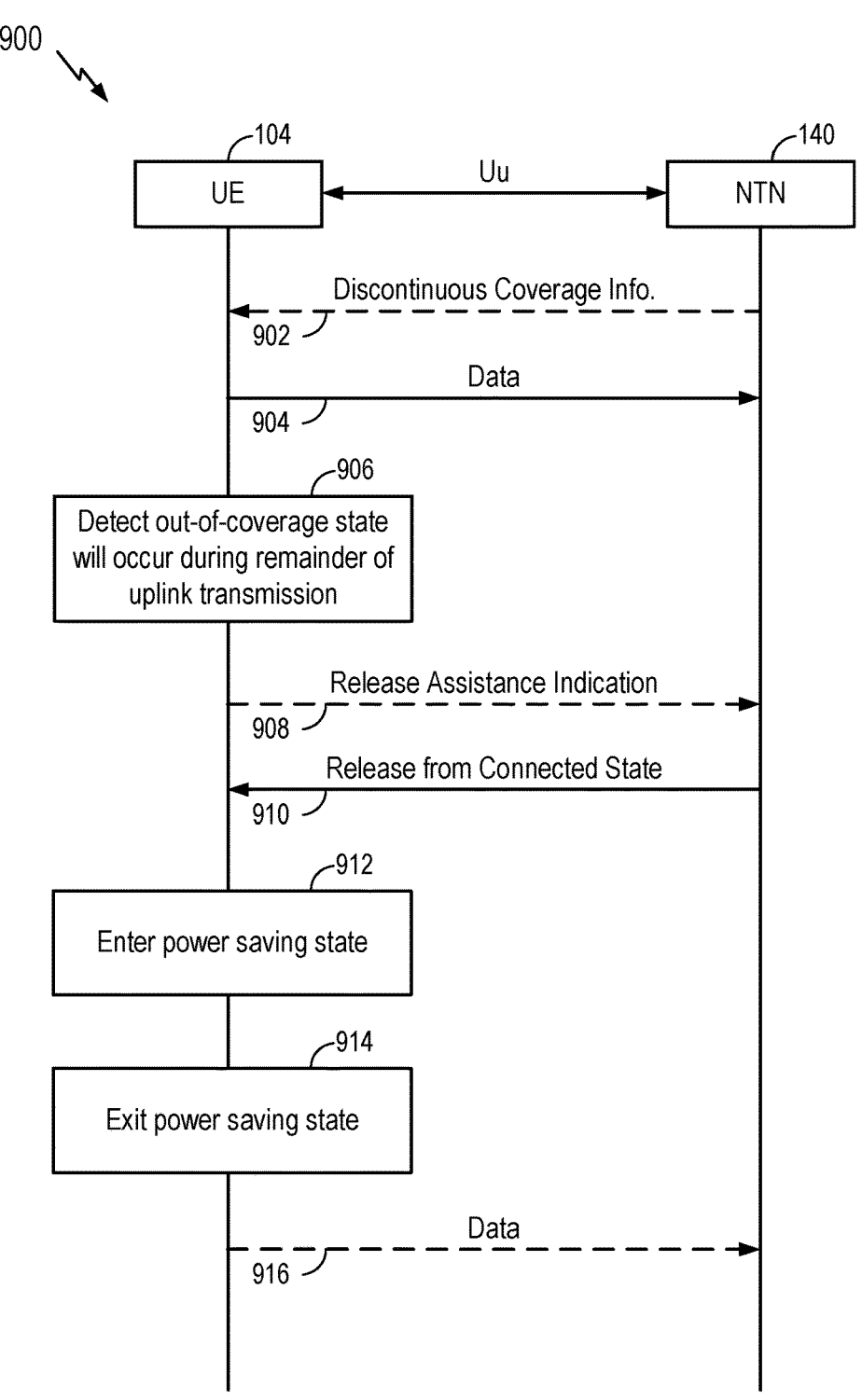
FIG. 9 is a signaling flow diagram illustrating example signaling for resuming communications with a non-terrestrial network using a connection release.

FIG. 9 depicts an example signaling flow 900 for resuming communications for discontinuous coverage in an NTN. The flow may optionally begin at step 902, the UE 104 may receive, from the NTN 140, information related to the discontinuous coverage of an NTN, for example, as described herein with respect to FIG. 8.

At step 904, the UE 104 may transmit data to the NTN 140. For example, UE 104 may be uploading a file or sending application data to a server.

At step 906, the UE 104 may detect that the out-of-coverage state will occur during the remainder of the uplink transmission. For example, the UE 104 may determine that the UE cannot complete the uplink transmission before the coverage gap begins based on the discontinuous coverage information received at step 902 and the remaining uplink data in a buffer.

At step 908, the UE 104 may send, to the NTN 140, a release assistance indication (RAI) in response to the detection at step 906. The RAI may indicate to the NTN 140 to release the UE 104 from the connected state. In certain aspects, the RAI may include an indication that the request for release is due to the upcoming coverage gap.

At step 910, the UE 104 may receive, from the NTN 140, signaling indicating to release the UE from a connected state. In certain aspects, the release may indicate that the release is due to the upcoming coverage, which may trigger the UE 104 to enter a power saving state. For example, the signaling at step 910 may release the UE to an idle state (e.g., RRC idle), an inactive state (e.g., RRC inactive), and/or a suspended state. In certain cases, the NTN 140 may send the signaling in response to the RAI at step 908. In certain cases, the NTN 140 may send the signaling based on the determination that the UE 104 will enter the coverage gap.

At step 912, the UE 104 may enter a power saving state (e.g., DRX sleep cycle, PSM, or MICO), for example, in response to receiving the release at step 910.

At step 914, the UE 104 may exit the power saving state, for example, when the UE expects to be in coverage of the NTN 140. The UE 104 may determine when the coverage gap of the NTN 140 will end, for example, based on the discontinuous coverage information received at step 902 or a previous coverage gap encountered by the UE 104 for that NTN 140. The UE 104 may exit the power saving state based on the determination of when the coverage gap will end.

At step 916, the UE 104 may resume communications with the NTN 140 after exiting the power saving state. For example, if the uplink transmission was interrupted by the coverage gap, the UE 104 may resume transmitting the data to the NTN 140 after exiting the power saving state.

Those of skill in the art will appreciate that certain aspects of the signaling flows depicted in FIGS. 6, 8, and/or 9 may be implemented separately or in various combinations with each other. While the examples depicted in FIGS. 6, 8, and 9 are described herein with respect to a UE communicating with an NTN to facilitate understanding, aspects of the present disclosure may also be applied to a UE communicating with a network entity (such as a base station and/or NTN) in a wireless network. For example, a UE may communicate with a terrestrial-based base station for certain transmission (such as system information and/or discontinuous coverage information), and the UE may communicate with a NTN for other transmissions (for example, for carrier aggregation and/or coverage enhancements).

FIG. 10 depicts an example method 1000 for resuming communications in discontinuous coverage in an NTN. The method 1000 may optionally begin, at step 1002, where a UE (e.g., the UE 104) may determine that the UE is or will be in an out-of-coverage state with an NTN (e.g., the NTN 140) for a first duration (e.g., the revisit time 506). For example, the UE may determine when the coverage gap(s) for a particular NTN will occur based on discontinuous coverage information obtained from the wireless network (e.g., via system information or RRC signaling) or previous encounters with the NTN's coverage gap. In certain aspects, the UE may determine that the UE is in the coverage gap based on the lack of communications between the UE and NTN. That is, the UE may consider the lack of communications between the UE and NTN an indication that the UE is in the coverage gap. For example, the UE may detect the absence of reference signals being transmitted from the NTN or the absence of paging signals being transmitted from the NTN for a certain number of paging occasions within a DRX cycle.

At step 1004, the UE may enter a power saving state in response to the determination. For example, the UE may initiate the PSM or the eDRX cycle, for example, when the UE expects the out-of-coverage state to begin. In certain aspects, the UE may refrain from monitoring for paging signals during the coverage gap, as further described herein. Entering the power saving state may enable the UE to conserve power when the UE is unable to communicate with the NTN during the coverage gap.

At step 1006, the UE may exit the power saving state when the UE expects to be in an in-coverage state with the NTN. For example, the UE may initiate a reachable timer for the PSM when the UE expects to be in an in-coverage state with the NTN. Initiation of the reachable timer may trigger the UE to monitor for signal(s) from the NTN.

At step 1008, the UE may take one or more actions to resume communications with the NTN. In certain cases, the action(s) taken may avoid the UE from encountering paging failures due to the coverage gap. For example, the UE may monitor for a paging signal from the NTN after exiting the power saving state. In certain aspects, the UE may transmit, to the NTN, an indication that the UE is in the in-coverage state. Such an indication may enable the NTN to know when the UE is available for resuming communications. In certain aspects, the UE may receive, from In certain aspects, the UE may override or extend a configuration for a power saving state, for example, as described herein with respect to FIGS. 6 and 7. In certain cases, the reachable period (e.g., a paging monitoring window) of a power saving state may overlap with the coverage gap of an NTN, for example, as described herein with respect to FIG. 7. Due to the overlap between the reachable period and the coverage gap, a UE may be unreachable when the UE wakes up from DRX or PSM. When a UE is in a power saving state (e.g., eDRX cycle, PSM, or MICO mode), the UE may wake up to monitor a certain number of paging occasions during the in-coverage period (e.g., the in-coverage period 706). In certain aspects, the UE may sleep during a paging monitoring window that coincides with coverage gap. The UE may wake up in the middle of a DRX cycle, PSM, or MICO sleep to monitor a certain number of paging occasions from the NTN when the UE expects to be in the in-coverage state. The UE may be provided an indication whether to override or extend the configuration for the power saving state, for example, as described herein with respect to FIG. 6. The indication may be provide via system information (e.g., a system information block), an RRC message, a MAC control element, or a non-access stratum (NAS) message. The network may be aware of the extended paging window and use the extended paging window to communicate with the UE after the coverage gap.

With respect to the method 1000, the UE may remain in a power saving state during the coverage gap despite a configuration for the power saving state indicating to monitor for paging during a certain period that overlaps with the coverage gap. For example, the UE may obtain a configuration (e.g., a DRX configuration) for the power saving state. The configuration may include a paging monitoring window (e.g., the paging time window 702), a sleeping window (e.g., the sleep period 708). The configuration may indicate when the paging monitor window and sleeping window will occur, for example, in terms of a periodicity, an start offset, and an on-duration (e.g., a duration of the paging time window). The configuration may indicate to monitor for paging during a paging monitoring window (e.g., the paging time window 702) that coincides (e.g., overlaps) with the out-of-coverage state (e.g., the coverage gap 704). For example, the configuration may indicate a paging monitoring window that coincides with the out-of-coverage state. In response to the determination that the UE is in the out-of-coverage state, the UE may refrain from monitoring for paging from the NTN during the out-of-coverage state, for example, when the paging monitoring window coincides (overlaps in time) with the out-of-coverage state.

In certain aspects, the UE may monitor for paging when the UE expects to be in the in-coverage state. For example, the UE may obtain a configuration (e.g., a DRX configuration) for the power saving state, and the configuration may indicate to be in the power saving state for a second duration that coincides with the in-coverage state. Optionally, at step 1010, the UE may monitor for a paging signal from the NTN in one or more paging occasions (e.g., the extended paging window 710) in the in-coverage state (e.g., the second in-coverage period 706) during the second duration. The UE may go back to sleep if there is no paging received during the extended paging window. For example, the UE may resume the monitoring cycle of the power saving state (e.g., a DRX cycle).

For certain aspects, the UE may receive an indication to override or extend the configuration for the power saving state. For example, the configuration may indicate to monitor for paging during a paging window that coincides with the out-of-coverage state and indicates to be in the power saving state for a second duration that coincides with the in-coverage state. The UE may receive, from a network entity, an indication to override or extend the configuration for the power saving state in response to the determination that the UE is or will be in the out-of-coverage state. As an example, the determination that UE is or will be in the coverage may trigger the UE to implement the indication to override or extend the configuration. In accordance with the indication, the UE may refrain from monitoring for a paging signal during the out-of-coverage state and/or monitor for a paging signal from the NTN in the extended paging window during the in-coverage state.

In certain aspects, the UE may notify the network when the UE returns back to in coverage with the NTN, for example, as described herein with respect to FIG. 8. With respect to the method 1000, optionally, at step 1012, the UE may transmit, to the NTN after exiting the power saving state, an indication that the UE is in the in-coverage state. For example, if the UE fails to monitor at least a certain number of paging occasions due to the out-of-coverage issue, the UE can send an in-coverage indication to the network. The indication may enable the network to send any missed paging messages or other signaling during the coverage when the UE comes back to in-coverage.

The in-coverage indication may be explicitly or implicitly indicated to the network. In certain aspects, the in-coverage indication may include a tracking area update (TAU) request (which may be triggered from a NAS layer), a RRC message (such as an RRC connection request handled by the access stratum (AS) layer), a MAC message (such as a logical channel identifier (LCD) in a MAC-CE), or a random access channel (RACH) resource or preamble. The UE may transmit the in-coverage indication via RRC signaling (e.g., an establishment cause specific to the in-coverage indication), MAC signaling (e.g., an LCID having a codepoint specific to the in-coverage indication), or a random access message (e.g., a random access preamble or payload message (MSG3)). For RRC signaling, the in-coverage indication may include an establishment cause specific to the in-coverage state of the UE. For random access, specific RACH resource(s) (e.g., frequency domain and/or time domain resource) and/or a specific random access preamble sequence may indicate that the UE is in-coverage with the NTN. That is, a specific random access preamble sequence and/or random access resource may be dedicated for indicating the UE is in the in-coverage state. A separate field or element in a particular message (e.g., TAU, RRC, or MAC) may indicate that the UE is in-coverage with the NTN. For example, a new in-coverage indication as establishment/resumption cause can be provided in the message, for example, using LCD, PRACH resource, or new cause value for in-coverage indication. If there is no pending paging/downlink message, the UE may be released to a power saving state, such as idle mode. For example, assuming the indication is sent via a preamble or message three (MSG3) in a four-step RACH procedure, message four (MSG3) may indicate the release to idle mode.

In certain aspects, the UE may be configured with a specific backoff timer that determines when to send the in-coverage indication. The UE may transmit the in-coverage indication after the backoff timer expires. The backoff timer may start when the UE is in the in-coverage state or when the UE initiates a random access procedure upon detection of the in-coverage state. The UE may initiate the backoff timer when the UE expects to return to the in-coverage state or when the UE identifies that the UE is in-coverage with the NTN (for example, due to the presence of reference signaling from the NTN). In certain cases, the backoff timer may be associated with a random access procedure. The backoff timer may have a random value provided to the UE or derived at the UE.

In certain aspects, the UE may trigger sending the in-coverage indication in response to the determination that the UE is or will be in the out-of-coverage state. The UE may transmit the in-coverage indication in response to detecting that the UE is in the out-of-coverage state during one or more paging occasions scheduled for the UE (e.g., the paging occasions may be configured for the UE or where the UE is configured to monitor for paging). For example, the UE may wake up to send the in-coverage indication if the UE fails to detect paging in at least a certain number (>=1) of paging occasions during a paging window when DRX or PSM is configured. The UE may determine that the UE is in the out-of-coverage state based on a number of paging occasions in which the UE fails to detect a signal (e.g., a reference signal and/or paging signal) from the NTN.

In certain aspects, the in-coverage indication may be a TAU request associated with a PSM. For example, the UE may be configured with a PSM, and the UE may determine when the UE is or will be in the out-of-coverage state. If the UE is aware of the discontinuous coverage of the NTN (e.g., as provided by the network or derived from previous coverage gaps), the UE may estimate when the next in-coverage period will occur. When a UE wakes up from sleep or exits PSM or MICO mode, the UE may estimate the time for the next in-coverage period. The UE may stay in a power saving state until the in-coverage period starts.

The AS layer may indicate a delay (or estimated time) in cell selection to the NAS layer, and the NAS layer may wait to trigger TAU request (e.g., the in-coverage indication) until the delay expires. The UE may provide an indication to delay in cell selection to a NAS layer in response to the determination that the UE is in the out-of-coverage state, and the UE may transmit the in-coverage indication (e.g., the TAU request) in response to a trigger from the NAS layer after the delay is expired.

In certain aspects, the NAS layer may receive the information (e.g., as indicated by the AS layer) on when the next in-coverage state will start. The NAS layer may adjust (extend or shorten) the PSM timer and TAU update timer to align with when the in-coverage period will occur. The UE may adjust, at a NAS layer, a duration of a timer associated with the power saving state or periodic registration, such that the timer will expire when the UE expects to be in the in-coverage state, and the UE may transmit the in-coverage indication (e.g., the TAU request) in response to expiration of the timer. In certain cases, the TAU request may be sent via a RACH procedure, and the in-coverage indication may be transmitted via a random access preamble sequence or random access resource dedicated for requesting a tracking area update In certain aspects, the UE may apply a backoff timer for sending the TAU request. For example, the UE may be provided with backoff timer value via a broadcast message (e.g., system information), RRC message, NAS message. The UE may receive signaling indicating a duration for a backoff timer (or enabling the backoff timer), which may start when the UE is in the in-coverage state. The UE may transmit the in-coverage indication in response to the expiration of the backoff timer based on the indicated duration of the backoff timer. When a UE finds suitable cell at or after the start of in-coverage period, the UE applies the backoff timer to send the TAU request. The backoff timer may avoid spectral congestion when several UEs attempt to send the in-coverage indication at the same time. The NAS layer may apply the backoff timer to trigger the TAU request. The AS layer may apply the backoff timer to initiate a random access procedure. Whether to apply the backoff timer may depend on how long the UE takes to synchronize with or obtain the global navigation satellite system (GNSS) for initiating random access procedure. In certain aspects, a dedicated PRACH resource(s) and/or preamble may be used to indicate the in-coverage state for the TAU update request.

In certain cases, the UE may suffer from the coverage gap when the UE is in a connected state (e.g., RRC connected state). For example, the UE may not be able to complete a downlink or uplink transmission due to the coverage gap, and the UE may continue to request reestablishment of the connection during the coverage gap.

The network may release the UE from the connected state before the UE enters the coverage gap. Such a release may enable the UE to enter a power saving state and resume the connection with the NTN when the coverage gap ends. With respect to the method 1000, optionally at step 1014, the UE may receive, from a network entity, signaling indicating to release the UE from a connected state. In certain aspects, the signaling may further indicate a cause of the release as out-of-coverage with the NTN. In certain aspects, the signaling may further indicate a start offset to a paging monitoring timer of the power saving state or when to expect to be in the in-coverage state.

For example, the UE may be released to an idle state (e.g., RRC idle), an inactive state (e.g., RRC inactive), or an RRC suspended mode. In certain aspects, the connection release may provide the UE with when to exit the power saving state, such as an offset for a UE reachable timer for PSM or an offset for a paging monitoring window for a DRX cycle. The offset may be provided by system information, RRC signaling, MAC signaling, or NAS signaling, for example. In certain aspects, the connection release may include a separate field or element to indicate when the exit the power saving state. For example, a new release cause may be defined to adjust NAS timers or establishment/resumption of connection at the right time. The UE may resume the remaining uplink or downlink transmissions in the in-coverage state.

In certain aspects, the UE may request for the network to release the connection before the coverage gap begins. For example, if the UE has uplink data to transmit but the UE estimates that the UE cannot complete the transmission with the amount of time left for the in-coverage period, the UE may request the network to release the connection. The UE may transmit a release assistance indication (RAI) to the network, for example, as described herein with respect to FIG. 9. With respect to the method 100, the UE may transmit, to the NTN before entering the power saving state, a RAI in response to the determination that the UE will be in the out-of-coverage state, and in certain cases, the UE may receive, from a network entity, signaling indicating to release the UE from a connected state in response to the release assistance indication. The request to release the connection may be useful as the network may not be aware of the UE's exaction location and time left for the in-coverage period. The RAI for requesting a connection release due to the upcoming coverage gap may be triggered in the AS or NAS layer. In certain aspects, the transmission of the RAI may be triggered in response to a buffer status report or a downlink channel quality report in an AS MAC control element. The RAI may be included in a MAC control element such as the buffer status report and/or the downlink channel quality report. For example, the RAI may be carried in or with the buffer status report, the downlink channel quality report, and/or a NAS RAI. The RAI may include an implicit or explicit indication to release the connection due to the upcoming coverage gap. In certain aspects, the release assistance indication may include an out-of-coverage indication (e.g., indicating that the UE is expected to be or will be out of coverage with a cell). The out-of-coverage indication for the RAI may be a specific codepoint (codeword or index) value of an LCD field and/or a separate field for the RAI information (e.g., an RAI information field), for example, in the MAC control element.

FIG. 11 depicts an example method 1100 for resuming communications for an NTN with discontinuous coverage. The method 1100 may optionally begin, at step 1102, where a network entity (e.g., the base station 102, NTN 140, EPC 160, and/or 5GC 190) may determine that a UE is or will be in an out-of-coverage state with a NTN (e.g., the NTN 140) for a first duration (e.g., the revisit time 506). For example, the network entity may identify that the UE is in the coverage area of an NTN with discontinuous coverage, and the network entity may be aware of the coverage gap pattern for the NTN (e.g., when and where a coverage gap will occur). As used herein, a network entity may refer to a wireless communication device in a radio access network, such as a base station, a remote radio head or antenna panel in communication with a base station, a non-terrestrial network, a core network, and/or a network controller.

At step 1104, the network entity may refrain from communicating with the UE during the first duration in response to the determination. For example, the network entity may pause certain transmissions, such as paging signal, to the UE during the coverage gap. Such a pause in transmissions may provide desirable spectral efficiencies for communicating with other UEs.

At step 1106, the network entity may take one or more actions to resume communications between the NTN and the UE. For example, the network entity may transmit a paging signal to the UE after a coverage gap in an extended paging window, as described herein with respect to FIG. 7. The network entity may receive an in-coverage indication from the UE, and the network entity may resume communications with the UE in response to the in-coverage indication, for example, as described herein with respect to FIG. 8.

In certain aspects, the network entity may be aware of the UE overriding or extending a configuration for a power saving state, for example, as described herein with respect to FIGS. 6 and 7. The network entity may obtain a configuration (e.g., a DRX configuration) for a power saving state associated with the UE. The configuration may indicate for the UE to monitor for paging during a paging monitoring window that coincides with the out-of-coverage state. For example, the UE may have a configured paging monitoring window that coincides with coverage gap. In certain cases, the network entity may not obtain such a configuration, and the network entity may be aware that the UE may monitor for paging after the coverage gap. The network entity may refrain from paging the UE (e.g., via the NTN) during the out-of-coverage state in response to the determination that the UE is in the out-of-coverage state. In certain cases, the network entity may store and delay any paging for the UE until the UE is in coverage with the NTN, for example, in the extended paging window. In aspects, the configuration may indicate to be in the power saving state for a second duration that coincides with an in-coverage state between the UE and the NTN. With respect to the method 1100, optionally at step 1108, the network entity may transmit, to the UE, a paging signal from the NTN in one or more paging occasions (e.g., the extended paging window 710) in the in-coverage state. The network entity may transmit, to the UE, an indication to override or extend the configuration for the power saving state in response to determining that the UE is or will be in the out-of-coverage state with the NTN.

For certain aspects, following a coverage gap, the network entity may receive, from the UE, an indication that the UE is in the in-coverage state with the NTN, for example, as described herein with respect to FIGS. 8 and 10. Such an indication may enable the NTN to know when to resume communications with the UE, and the NTN may resume communications with the UE in response to the indication. Optionally, at step 1110, the network entity may resume communications with the UE via the NTN in response to an indication, from the UE, that the UE is in an in-coverage state with the NTN. The in-coverage indication may be received via a TAU request, RRC signaling, MAC signaling, or a random access message (e.g., the preamble), as described herein with respect to FIG. 10. For certain aspects, the network entity may transmit, to the UE, signaling indicating a duration for a backoff timer for when to transmit the in-coverage indication. The network entity may receive the in-coverage indication based on the backoff timer.

According to certain aspects, the network entity may release the UE from a connected state before the out-of-coverage state begins, for example, as described herein with respect to FIGS. 9 and 10. For example, optionally, at step 1112, the network entity may transmit, to the UE before the out-of-coverage state begins, signaling indicating to release the UE from a connected state. Such a release may enable the UE to enter a power saving state without wasting attempts to reestablish a connection with the network entity. In aspects, the signaling may further indicate a cause of the release as out-of-coverage, a start offset to a paging monitoring timer (e.g., a paging time window for DRX or a reachable timer for PSM) of a power saving state, or when to expect to be in an in-coverage state. For certain aspects, the network entity may receive a request from the UE to release the connection between the UE and the network entity, for example, due to the upcoming coverage gap of the NTN. The network entity may receive, from the UE before the out-of-coverage state begins, a release assistance indication, and the network entity may transmit, to the UE, signaling indicating to release the UE from a connected state in response to the release assistance indication. In certain aspects, the release assistance indication may include an out-of-coverage indication (e.g., an indication that the UE will be out-of-coverage with the NTN due to the coverage gap).

Example Wireless Communication Devices

Figure 12:
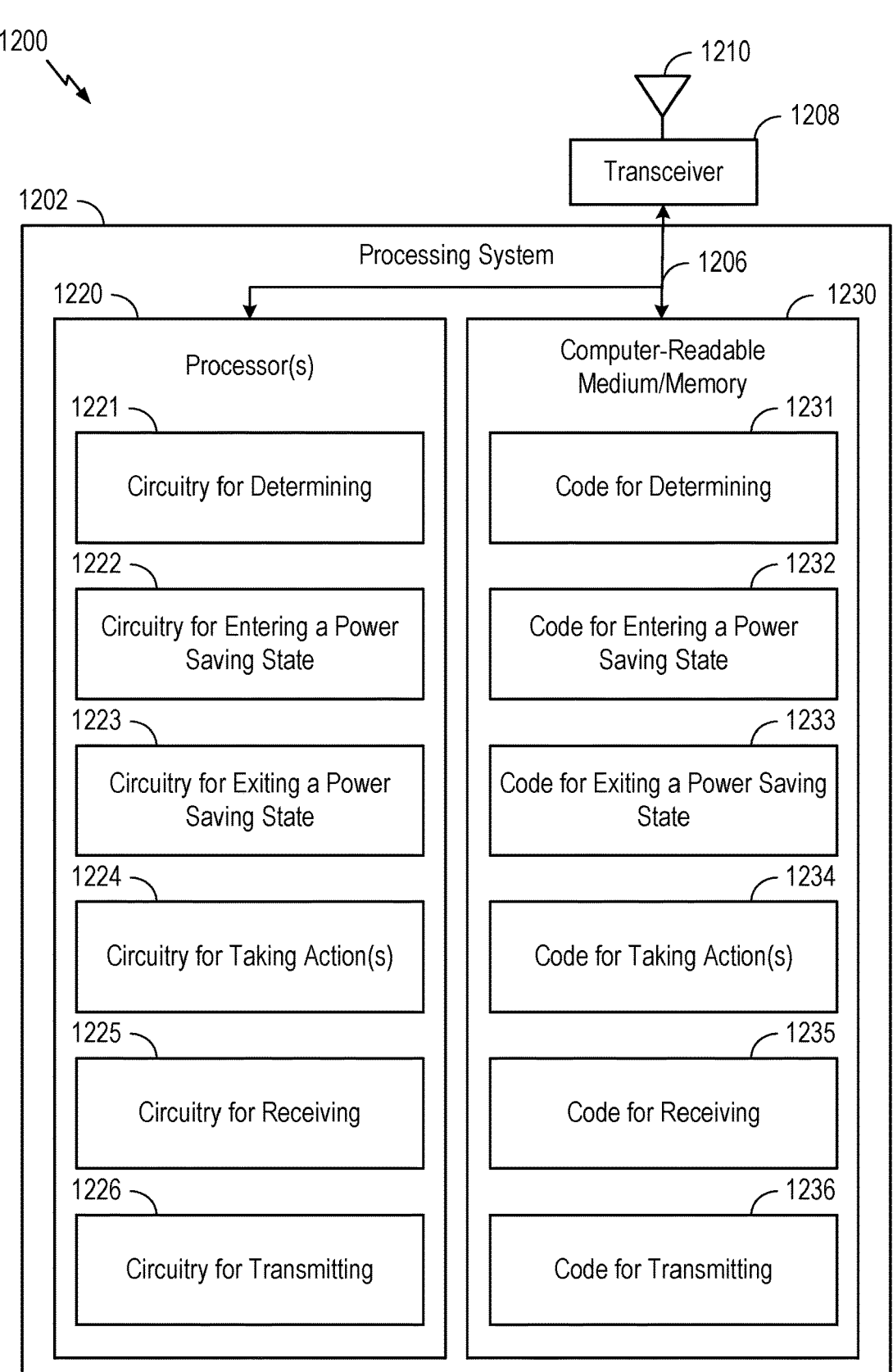
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 6-10. In some examples, communication device 1200 may be a user equipment 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. FIGS. 6-10, or other operations for performing the various techniques discussed herein for resuming communications with an NTN.

In the depicted example, computer-readable medium/memory 1230 stores code 1231 for determining, code 1232 for entering a power saving state, code 1233 for exiting a power saving state, code 1234 for taking action(s), code 1235 for receiving, and code 1236 for transmitting.

In the depicted example, the one or more processors 1220 include circuitry configured to implement the code stored in the computer-readable medium/memory 1230, including circuitry 1221 for determining, circuitry 1222 for entering a power saving state, circuitry 1223 for exiting a power saving state, circuitry 1224 for taking action(s) circuitry 1225 for receiving, and circuitry 1226 for transmitting.

Various components of communications device 1200 may provide means for performing the methods described herein, including with respect to FIGS. 6-10.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna (s) 252 of the user equipment 104 illustrated in FIG. 2 and/or transceiver 1208 and antenna 1210 of the communication device 1200 in FIG. 12.

In some examples, means for determining, entering a power saving state, exiting a power saving state, and/or taking action(s) may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including discontinuous coverage component 281).

Notably, FIG. 12 is an example, and many other examples and configurations of communication device 1200 are possible.

FIG. 13 depicts an example communications device 1300 that includes various components operable, configured, or adapted to perform operations for the techniques disclosed herein, such as the operations depicted and described with respect to FIGS. 6-9, and 11. In some examples, communication device 1300 may be a base station 102 or non-terrestrial network entity 140 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 6-9, and 11, or other operations for performing the various techniques discussed herein for resuming communications between a UE and an NTN.

In the depicted example, computer-readable medium/ memory 1330 stores code 1331 for determining, code 1332 for refraining, code 1333 for taking action(s), code 1334 for transmitting, code 1335 for receiving, and code 1336 for resuming communications.

In the depicted example, the one or more processors 1320 include circuitry configured to implement the code stored in the computer-readable medium/memory 1330, including circuitry 1321 for determining, circuitry 1322 for refraining, circuitry 1323 for taking action(s), circuitry 1324 for transmitting, circuitry 1325 for receiving, and circuitry 1326 for resuming communications.

Various components of communications device 1300 may provide means for performing the methods described herein, including with respect to FIGS. 6-9, and 11.

In some examples, means for transmitting or sending (or means for outputting for transmission) may include the transceivers 232 and/or antenna(s) 234 of the base station 102 illustrated in FIG. 2 and/or transceiver 1308 and antenna 1310 of the communication device 1300 in FIG. 13.

In some examples, means for receiving (or means for obtaining) may include the transceivers 232 and/or antenna (s) 234 of the base station illustrated in FIG. 2 and/or transceiver 1308 and antenna 1310 of the communication device 1300 in FIG. 13.

In some examples, means for determining, refraining, taking action(s), and/or resuming communications may include various processing system components, such as: the one or more processors 1320 in FIG. 13, or aspects of the base station 102 depicted in FIG. 2, including receive processor 238, transmit processor 220, TX MIMO processor 230, and/or controller/processor 240 (including discontinuous coverage component 241).

Notably, FIG. 13 is an example, and many other examples and configurations of communication device 1300 are possible.

Example Clauses

Implementation examples are described in the following numbered clauses:

Clause 1: A method of wireless communication by a user equipment (UE), comprising: determining that the UE is or will be in an out-of-coverage state with a non-terrestrial network (NTN) for a first duration; entering a power saving state in response to the determination; exiting the power saving state when the UE expects to be in an in-coverage state with the NTN; and taking one or more actions to resume communications with the NTN.

Clause 2: The method of Clause 1, further comprising: obtaining a configuration for the power saving state, wherein the configuration includes a paging monitoring window and a sleeping window; and refraining from monitoring for paging during the out-of-coverage state in response to the determination when the paging monitoring window coincides with the out-of-coverage state.

Clause 3: The method according to any one of Clauses 1 or 2, wherein: taking one or more actions comprises monitoring for a paging signal from the NTN in one or more paging occasions in the in-coverage state during a second duration, wherein the configuration further indicates to be in the power saving state for the second duration that coincides with the in-coverage state.

Clause 4: The method of Clause 1, further comprising: obtaining a configuration for the power saving state, wherein the configuration indicates to exit the power saving state for a second duration that coincides with the out-of-coverage state and indicates to be in the power saving state for a third duration that coincides with the in-coverage state; receiving, from a network entity, an indication to override the configuration for the power saving state in response to the determination; refraining from exiting the power saving state during the out-of-coverage state in accordance with the indication to override the configuration; and taking one or more actions comprises monitoring, after exiting the power saving state, for a paging signal from the NTN in one or more paging occasions in the in-coverage state in accordance with the indication to override the configuration.

Clause 5: The method according to any one of Clauses 1-4, wherein taking one or more actions comprises transmitting, to the NTN after exiting the power saving state, an indication that the UE is in the in-coverage state.

Clause 6: The method according to any one of Clauses 1-5, wherein determining that the UE is in the out-of-coverage state is based on a number of paging occasions in which the UE fails to detect a signal from the NTN.

Clause 7: The method according to any one of Clause 5 or 6, wherein transmitting the indication comprises transmitting the indication via radio resource control (RRC) signaling, medium access control (MAC) signaling, or a random access message.

Clause 8: The method according to any one of Clauses 5 or 7, wherein transmitting the indication comprises transmitting the indication via a random access preamble sequence or random access resource dedicated for indicating the UE is in the in-coverage state.

Clause 9: The method according to any one of Clauses 5, 7, or 8, wherein the indication comprises a tracking area update (TAU) request triggered from a non-access stratum (NAS) layer.

Clause 10: The method according to any one of Clauses 5 or 7-9, wherein the indication comprises an RRC connection request message triggered from an access stratum (AS) layer.

Clause 11: The method according to any one of Clauses 5 or 7-10, wherein transmitting the indication comprises transmitting the indication after a backoff timer expires, wherein the backoff timer starts when the UE is in the in-coverage state or when the UE initiates a random access procedure upon detection of the in-coverage state.

Clause 12: The method according to any one of Clauses 5 or 7-11, wherein transmitting the indication comprises transmitting the indication in response to detecting that the UE is in the out-of-coverage state during one or more paging occasions where the UE is configured to monitor for paging.

Clause 13: The method according to any one of Clauses 5 or 7-12, wherein the indication comprises a tracking area update request.

Clause 14: The method of Clause 13, wherein: entering the power saving state comprises providing an indication to delay in cell selection to a NAS layer in response to the determination; and transmitting the indication comprises transmitting the indication in response to a trigger from the NAS layer after the delay is expired.

Clause 15: The method of Clause 13, wherein: entering the power saving state comprises adjusting, at a NAS layer, a duration of a timer associated with the power saving state or periodic registration, such that the timer will expire when the UE expects to be in the in-coverage state; and transmitting the indication comprises transmitting the indication in response to expiration of the timer.

Clause 16: The method according to any one of Clauses 13-15, further comprising: receiving signaling indicating a duration for a backoff timer that starts when the UE is in the in-coverage state; and transmitting the indication comprises transmitting the indication in response to expiration of the backoff timer based on the indicated duration of the backoff timer.

Clause 17: The method according to any one of Clauses 13-16 wherein transmitting the indication comprises transmitting the indication via a random access preamble sequence or random access resource dedicated for requesting a tracking area update.

Clause 18: The method according to any one of Clauses 1-17, wherein taking one or more actions comprises: receiving, from a network entity before entering the power saving state, signaling indicating to release the UE from a connected state, wherein the signaling further indicates a cause of the release as out-of-coverage.

Clause 19: The method of Clause 18, wherein the signaling further indicates a start offset to a paging monitoring timer of the power saving state or when to expect to be in the in-coverage state.

Clause 20: The method according to any one of Clauses 1-19, wherein taking one or more actions comprises: transmitting, to the NTN before entering the power saving state, a release assistance indication in response to the determination; and receiving, from a network entity, signaling indicating to release the UE from a connected state in response to the release assistance indication.

Clause 21: The method of Clause 20, wherein transmission of the release assistance indication is carried in: a buffer status report, a downlink channel quality report in an access stratum (AS) medium access control (MAC) control element, or non-access stratum (NAS) release assistance indication information; and wherein the release assistance indication includes an out-of-coverage indication.

Clause 22: The method of Clause 21, wherein the out-of-coverage indication may include a codeword for a logical channel identity (LCID) or another codeword for a release assistance indication field.

Clause 23: A method of wireless communication by a network entity, comprising: determining that a user equipment (UE) is or will be in an out-of-coverage state with a non-terrestrial network (NTN) for a first duration; refraining from communicating with the UE during the first duration in response to the determination; and taking one or more actions to resume communications between the NTN and the UE.

Clause 24: The method of Clause 23, wherein: refraining from communicating with the UE comprises refraining from paging the UE during the out-of-coverage state in response to the determination; and taking one or more actions comprises transmitting, to the UE, a paging signal from the NTN in one or more paging occasions in the in-coverage state.

Clause 25: The method of Clause 23, further comprising: obtaining a configuration for a power saving state for the UE, wherein the configuration indicates to be in the power saving state for a second duration that coincides with an in-coverage state between the UE and the NTN; and wherein taking one or more actions comprises transmitting, to the UE, a paging signal from the NTN in one or more paging occasions in the in-coverage state.

Clause 26: The method according to any one of Clauses 23-25, further comprising transmitting, to the UE, an indication to override or extend the configuration for the power saving state in response to determining that the UE is or will be in the out-of-coverage state with the NTN.

Clause 27: The method according to any one of Clauses 23-26, wherein taking one or more actions comprises: receiving, from the UE, an indication that the UE is in an in-coverage state with the NTN; and resuming communications with the UE in response to the indication.

Clause 28: The method of Clause 27, wherein receiving the indication comprises receiving the indication via radio resource control (RRC) signaling, medium access control (MAC) signaling, or a random access message.

Clause 29: The method according to any one of Clauses 27 or 28, wherein receiving the indication comprises receiving the indication via a random access preamble sequence or random access resource dedicated for indicating the UE is in the in-coverage state.

Clause 30: The method according to any one of Clauses 27-29, further comprising: transmitting, to the UE, signaling indicating a duration for a backoff timer; and wherein receiving the indication comprises receiving the indication based on the backoff timer.

Clause 31: The method according to any one of Clauses 27-30, wherein the indication comprises a tracking area update request.

Clause 32: The method of Clause 31, wherein receiving the indication comprises receiving the indication via a random access preamble sequence or random access resource dedicated for requesting a tracking area update.

Clause 33: The method according to any one of Clauses 23-32, wherein taking one or more actions comprises: transmitting, to the UE before the out-of-coverage state begins, signaling indicating to release the UE from a connected state, wherein the signaling further indicates a cause of the release as out-of-coverage.

Clause 34: The method of Clause 33, wherein the signaling further indicates a start offset to a paging monitoring timer of a power saving state or when to expect to be in an in-coverage state.

Clause 35: The method according to any one of Clauses 23-34, wherein taking one or more actions comprises: receiving, from the UE before the out-of-coverage state begins, a release assistance indication having an out-of-coverage indication; and transmitting, to the UE, signaling indicating to release the UE from a connected state in response to the release assistance indication.

Clause 31: An apparatus, comprising: a memory comprising executable instructions; one or more processors configured to execute the executable instructions and cause the apparatus to perform a method in accordance with any one of Clauses 1-35.

Clause 32: An apparatus, comprising means for performing a method in accordance with any one of Clauses 1-35.

Clause 33: A non-transitory computer-readable medium comprising executable instructions that, when executed by one or more processors of an apparatus, cause the apparatus to perform a method in accordance with any one of Clauses 1-35.

Clause 34: A computer program product embodied on a computer-readable storage medium comprising code for performing a method in accordance with any one of Clauses 1-35.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating in discontinuous coverage of a non-terrestrial network in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:
    one or more memories coupled to
    one or more processors, wherein the one or more processors are configured to cause the apparatus to:
        receive a configuration to monitor one or more paging signals and a first indication to refrain from monitoring the one or more paging signals that are configured during an out-of-coverage state with a non-terrestrial network (NTN);
        determine that the UE is or will be in the out-of-coverage state with the NTN for a first duration;
        enter a power saving state in response to a determination that the UE is or will be in the out-of-coverage state with the NTN for the first duration;
        exit the power saving state when the UE expects to be in an in-coverage state with the NTN; and
        take one or more actions to resume communications with the NTN, wherein:
            the configuration includes a paging monitoring window and a sleeping window, wherein the one or more processors are configured to cause the apparatus to refrain from monitoring for paging during the out-of-coverage state when the paging monitoring window coincides with the out-of-coverage state, wherein to take the one or more actions, the one or more processors are configured to cause the apparatus to monitor for a paging signal from the NTN in one or more paging occasions in the in-coverage state during a second duration, and wherein the configuration further indicates to be in the power saving state for the second duration that coincides with the in-coverage state; or
        to take the one or more actions, the one or more processors are configured to cause the apparatus to receive, from a network entity before entering the power saving state, signaling indicating to release the UE from a connected state, wherein the signaling further indicates a cause of the release as out-of-coverage; or
        to take the one or more actions, the one or more processors are configured to cause the apparatus to transmit, to the NTN before entering the power saving state, a release assistance indication in response to the determination, and to receive, from the network entity, signaling indicating to release the UE from the connected state in response to the release assistance indication; or
        to take the one or more actions, the one or more processors are configured to cause the apparatus to transmit, to the NTN after exiting the power saving state, a second indication that the UE is in the in-coverage state, wherein the one or more processors are configured to cause the apparatus to start a backoff timer based on the UE being in the in-coverage state or an initiation of a random access procedure upon detection of the in-coverage state, and wherein to transmit the second indication, the one or more processors are configured to cause the apparatus to transmit the second indication after the backoff timer expires.

2. The apparatus of claim 1, wherein:
    the configuration includes the paging monitoring window and the sleeping window; and
    the one or more processors are configured to cause the apparatus to refrain from monitoring for paging during the out-of-coverage state when the paging monitoring window coincides with the out-of-coverage state.

3. The apparatus of claim 2, wherein to take the one or more actions, the one or more processors are configured to cause the apparatus to:
    monitor for the paging signal from the NTN in the one or more paging occasions in the in-coverage state during the second duration, wherein the configuration further indicates to be in the power saving state for the second duration that coincides with the in-coverage state.

4. The apparatus of claim 1, wherein to take the one or more actions, the one or more processors are configured to cause the apparatus to transmit, to the NTN after exiting the power saving state, the second indication that the UE is in the in-coverage state.

5. The apparatus of claim 4, wherein to transmit the second indication, the one or more processors are configured to cause the apparatus to transmit the second indication via radio resource control (RRC) signaling, medium access control (MAC) signaling, or a random access message.

6. The apparatus of claim 4, wherein to transmit the second indication, the one or more processors are configured to cause the apparatus to transmit the second indication via a random access preamble sequence or random access resource dedicated for indicating the UE is in the in-coverage state.

7. The apparatus of claim 4, wherein the second indication comprises a tracking area update (TAU) request triggered from a non-access stratum (NAS) layer.

8. The apparatus of claim 4, wherein the second indication comprises a radio resource control (RRC) connection request message triggered from an access stratum (AS) layer.

9. The apparatus of claim 4, wherein:

the one or more processors are configured to cause the apparatus to start the backoff timer based on the UE being in the in-coverage state or the initiation of the random access procedure upon detection of the in-coverage state; and to transmit the second indication, the one or more processors are configured to cause the apparatus to transmit the second indication after the backoff timer expires.

10. The apparatus of claim 4, wherein to transmit the second indication, the one or more processors are configured to cause the apparatus to transmit the second indication based on the UE being in the out-of-coverage state during one or more paging occasions where the UE is configured to monitor for paging.

11. The apparatus of claim 1, wherein the one or more processors are configured to cause the apparatus to determine that the UE is in the out-of-coverage state based on a number of paging occasions in which the UE fails to detect a signal from the NTN.

12. The apparatus of claim 1, wherein to take the one or more actions, the one or more processors are configured to cause the apparatus to receive, from the network entity before entering the power saving state, signaling indicating to release the UE from the connected state, wherein the signaling further indicates the cause of the release as out-of-coverage.

13. The apparatus of claim 12, wherein the signaling further indicates a start offset to a paging monitoring timer of the power saving state or when to expect to be in the in-coverage state.

14. The apparatus of claim 1, wherein to take the one or more actions, the one or more processors are configured to cause the apparatus to:

transmit, to the NTN before entering the power saving state, the release assistance indication in response to the determination; and receive, from the network entity, signaling indicating to release the UE from the connected state in response to the release assistance indication.

15. The apparatus of claim 14, wherein the release assistance indication is carried in:

a buffer status report, a downlink channel quality report in an access stratum (AS) medium access control (MAC) control element, or non-access stratum (NAS) release assistance indication information; and wherein the release assistance indication includes an out-of-coverage indication.

16. The apparatus of claim 15, wherein the out-of-coverage indication indicates a codeword for a logical channel identity (LCID) or another codeword for a release assistance indication field.

17. An apparatus for wireless communication at a user equipment (UE), comprising:

one or more memories coupled to one or more processors, wherein the one or more processors are configured to cause the apparatus to:

receive a configuration to monitor one or more paging signals and a first indication to refrain from monitoring the one or more paging signals that are configured during an out-of-coverage state with a non-terrestrial network (NTN);

determine that the UE is or will be in the out-of-coverage state with the NTN for a first duration;

enter a power saving state in response to a determination that the UE is or will be in the out-of-coverage state with the NTN for the first duration;

exit the power saving state when the UE expects to be in an in-coverage state with the NTN; and take one or more actions to resume communications with the NTN, wherein to take the one or more actions, the one or more processors are configured to cause the apparatus to transmit, to the NTN after exiting the power saving state, a second indication that the UE is in the in-coverage state, wherein the second indication comprises a tracking area update request, and wherein:

to enter the power saving state, the one or more processors are configured to cause the apparatus to provide a third indication to delay in cell selection to a non-access stratum (NAS) layer in response to the determination, and to transmit the second indication, the one or more processors are configured to cause the apparatus to transmit the second indication in response to a trigger from the NAS layer after the delay is expired; or to enter the power saving state, the one or more processors are configured to cause the apparatus to adjust, at a non-access stratum (NAS) layer, a duration of a timer associated with the power saving state or periodic registration such that the timer will expire when the UE expects to be in the in-coverage state, and to transmit the second indication, the one or more processors are configured to cause the apparatus to transmit the second indication in response to expiration of the timer; or the one or more processors are configured to cause the apparatus to receive signaling indicating a duration for a backoff timer that starts when the UE is in the in-coverage state, and to transmit the second indication, the one or more processors are configured to cause the apparatus to transmit the second indication in response to expiration of the backoff timer based on the indicated duration of the backoff timer.

18. The apparatus of claim 17, wherein:

to enter the power saving state, the one or more processors are configured to cause the apparatus to provide the third indication to delay in cell selection to the non-access stratum (NAS) layer in response to the determination; and to transmit the second indication, the one or more processors are configured to cause the apparatus to transmit the second indication in response to the trigger from the NAS layer after the delay is expired.

19. The apparatus of claim 17, wherein:

to enter the power saving state, the one or more processors are configured to cause the apparatus to adjust, at the non-access stratum (NAS) layer, the duration of the timer associated with the power saving state or periodic registration, such that the timer will expire when the UE expects to be in the in-coverage state; and to transmit the second indication, the one or more processors are configured to cause the apparatus to transmit the second indication in response to the expiration of the timer.

20. The apparatus of claim 17, wherein:
the one or more processors are configured to cause the apparatus to receive signaling indicating the duration for the backoff timer that starts when the UE is in the in-coverage state; and
to transmit the second indication, the one or more processors are configured to cause the apparatus to transmit the second indication in response to the expiration of the backoff timer based on the indicated duration of the backoff timer.

21. The apparatus of claim 17, wherein to transmit the second indication, the one or more processors are configured to cause the apparatus to transmit the second indication via a random access preamble sequence or random access resource dedicated for requesting a tracking area update.

22. A method for wireless communication at a user equipment (UE), comprising:
receiving a configuration to monitor one or more paging signals and a first indication to refrain from monitoring the one or more paging signals that are configured during an out-of-coverage state with a non-terrestrial network (NTN);
determining that the UE is or will be in the out-of-coverage state with the NTN for a first duration;
entering a power saving state in response to a determination that the UE is or will be in the out-of-coverage state with the NTN for the first duration;
exiting the power saving state when the UE expects to be in an in-coverage state with the NTN; and
taking one or more actions to resume communications with the NTN, wherein:
the configuration includes a paging monitoring window and a sleeping window, wherein the method comprises refraining from monitoring for paging during the out-of-coverage state when the paging monitoring window coincides with the out-of-coverage state, wherein taking the one or more actions comprises monitoring for a paging signal from the NTN in one or more paging occasions in the in-coverage state during a second duration, and wherein the configuration further indicates to be in the power saving state for the second duration that coincides with the in-coverage state; or
taking the one or more actions comprises transmitting, to the NTN after exiting the power saving state, a second indication that the UE is in the in-coverage state, wherein the method comprises starting a backoff timer based on the UE being in the in-coverage state or an initiation of a random access procedure upon detection of the in-coverage state, and wherein transmitting the second indication comprises transmitting the second indication after the backoff timer expires; or
taking the one or more actions comprises receiving, from a network entity before entering the power saving state, signaling indicating to release the UE from a connected state, wherein the signaling further indicates a cause of the release as out-of-coverage; or
taking the one or more actions comprises transmitting, to the NTN before entering the power saving state, a release assistance indication in response to the determination, and receiving, from the network entity, signaling indicating to release the UE from the connected state in response to the release assistance indication.

23. The method of claim 22, wherein the configuration includes the paging monitoring window and the sleeping window, wherein the method comprises refraining from monitoring for paging during the out-of-coverage state when the paging monitoring window coincides with the out-of-coverage state, wherein taking the one or more actions comprises monitoring for the paging signal from the NTN in the one or more paging occasions in the in-coverage state during the second duration, wherein the configuration further indicates to be in the power saving state for the second duration that coincides with the in-coverage state.

24. The method of claim 22, wherein:
taking the one or more actions comprises transmitting, to the NTN after exiting the power saving state, the second indication that the UE is in the in-coverage state;
the method comprises starting the backoff timer based on the UE being in the in-coverage state or the initiation of the random access procedure upon detection of the in-coverage state; and
transmitting the second indication comprises transmitting the second indication after the backoff timer expires.

25. The method of claim 22, wherein taking the one or more actions comprises receiving, from the network entity before entering the power saving state, signaling indicating to release the UE from the connected state, wherein the signaling further indicates the cause of the release as out-of-coverage.

26. The method of claim 22, wherein taking the one or more actions comprises:
transmitting, to the NTN before entering the power saving state, the release assistance indication in response to the determination; and
receiving, from the network entity, signaling indicating to release the UE from the connected state in response to the release assistance indication.

27. A method for wireless communication at a user equipment (UE), comprising:
receiving a configuration to monitor one or more paging signals and a first indication to refrain from monitoring the one or more paging signals that are configured during an out-of-coverage state with a non-terrestrial network (NTN);
determining that the UE is or will be in the out-of-coverage state with the NTN for a first duration;
entering a power saving state in response to a determination that the UE is or will be in the out-of-coverage state with the NTN for the first duration;
exiting the power saving state when the UE expects to be in an in-coverage state with the NTN; and
taking one or more actions to resume communications with the NTN,
wherein taking the one or more actions comprises transmitting, to the NTN after exiting the power saving state, a second indication that the UE is in the in-coverage state,
wherein the second indication comprises a tracking area update request, and
wherein:
entering the power saving state comprises providing a third indication to delay in cell selection to a non-access stratum (NAS) layer in response to the determination, and transmitting the second indication comprises transmitting the second indication in response to a trigger from the NAS layer after the delay is expired; or entering the power saving state comprises adjusting, at a non-access stratum (NAS) layer, a duration of a timer associated with the power saving state or periodic registration such that the timer will expire when the UE expects to be in the in-coverage state, and transmitting the second indication comprises transmitting the second indication in response to expiration of the timer; or the method comprises receiving signaling indicating a duration for a backoff timer that starts when the UE is in the in-coverage state, and transmitting the second indication comprises transmitting the second indication in response to expiration of the backoff timer based on the indicated duration of the backoff timer.

28. The method of claim 27, wherein:

entering the power saving state comprises providing the third indication to delay in cell selection to the non-access stratum (NAS) layer in response to the determination; and transmitting the second indication comprises transmitting the second indication in response to the trigger from the NAS layer after the delay is expired.

29. The method of claim 27, wherein:

entering the power saving state comprises adjusting, at the non-access stratum (NAS) layer, the duration of the timer associated with the power saving state or periodic registration, such that the timer will expire when the UE expects to be in the in-coverage state; and transmitting the second indication comprises transmitting the second indication in response to the expiration of the timer.

30. The method of claim 27, wherein:

the method comprises receiving signaling indicating the duration for the backoff timer that starts when the UE is in the in-coverage state; and transmitting the second indication comprises transmitting the second indication in response to the expiration of the backoff timer based on the indicated duration of the backoff timer.

\* \* \* \* \*